US012736339B2

(12) United States Patent
Yamaguchi et al.

(10) Patent No.: US 12,736,339 B2
(45) Date of Patent: Sep. 15, 2026

(54) ROAD SURFACE ABNORMALITY DETECTION APPARATUS, ROAD SURFACE ABNORMALITY DETECTION METHOD, AND NON-TRANSITORY COMPUTER READABLE MEDIUM

(71) Applicant: NEC Corporation, Tokyo (JP)

(72) Inventors: Masahiro Yamaguchi, Tokyo (JP); Kyota Higa, Tokyo (JP); Yusuke Nonaka, Kanagawa (JP); Hideo Saito, Kanagawa (JP); Hideaki Uchiyama, Kanagawa (JP)

(73) Assignee: NEC CORPORATION, Tokyo (JP)

( * ) Notice: Subject to any disclaimer, the term of this patent is extended or adjusted under 35 U.S.C. 154(b) by 35 days.

(21) Appl. No.: 18/755,809

(22) Filed: Jun. 27, 2024

(65) Prior Publication Data

US 2025/0020459 A1 Jan. 16, 2025

(30) Foreign Application Priority Data

Jul. 10, 2023 (JP) ................................ 2023-112811

(51) Int. Cl.
*G01C 7/04* (2006.01)
*G01C 21/36* (2006.01)

(52) U.S. Cl.
CPC .......... *G01C 7/04* (2013.01); *G01C 21/3667* (2013.01)

(58) Field of Classification Search
CPC .............................. G01C 7/04; G01C 21/3667
See application file for complete search history.

(56) References Cited

U.S. PATENT DOCUMENTS 9,361,797 B1 * 6/2016 Chen .................... G08G 1/0141
2022/0044034 A1 * 2/2022 RoyChowdhury ..... E01C 23/01

FOREIGN PATENT DOCUMENTS

KR 20210087005 A * 7/2021 ............. G06N 3/045
WO 2020/100893 A1 5/2020

* cited by examiner

*Primary Examiner* — Helal A Algahaim

(57) ABSTRACT

A road surface abnormality detection apparatus includes a data acquisition unit, a prediction unit, and an abnormality detection unit. The data acquisition unit acquires road surface observation data obtained by observing a road surface in a chronological order. The prediction unit predicts road surface data at a first timing from a plurality of road surface observation data at a plurality of respective timings earlier than the first timing by using a trained model generated in advance through machine learning. The abnormality detection unit detects, when a difference between road surface observation data at the first timing and the predicted road surface data at the first timing is equal to or larger than a predetermined threshold, an abnormality of the road surface.

16 Claims, 17 Drawing Sheets

ROAD SURFACE ABNORMALITY DETECTION APPARATUS, ROAD SURFACE ABNORMALITY DETECTION METHOD, AND NON-TRANSITORY COMPUTER READABLE MEDIUM

INCORPORATION BY REFERENCE

This application is based upon and claims the benefit of priority from Japanese patent application No. 2023-112811, filed on Jul. 10, 2023, the disclosure of which is incorporated herein in its entirety by reference.

TECHNICAL FIELD

The present disclosure relates to a road surface abnormality detection apparatus, a road surface abnormality detection method, and a program.

BACKGROUND ART

International Patent Publication No. WO2020/100893 discloses an estimation apparatus for estimating a label accurately indicating a status of data. The estimation apparatus disclosed in International Patent Publication No. WO2020/100893 inputs time series data into a first trained model for obtaining, for each of a plurality of types of labels, a likelihood of the label, and thereby estimates the likelihood of each label at each time point. The estimation apparatus disclosed in International Patent Publication No. WO2020/100893 inputs the estimated likelihood of each label at each time point into a second trained model for outputting one of the labels based on the change in the likelihood of each label, and thereby estimates (i.e., infers) one of the labels corresponding to the likelihood of each label at each time point.

In the technology described in International Patent Publication No. WO2020/100893, it is possible only to estimate the condition of the road surface that is defined by a label. That is, in the technology described in International Patent Publication No. WO2020/100893, it is possible only to estimate an abnormality of the road surface that is defined by a label. Therefore, in the technology described in International Patent Publication No. WO2020/100893, it is possible only to detect an abnormality of the road surface that was assumed at the time of the learning. In other words, in the technology described in International Patent Publication No. WO2020/100893, there is a possibility that an abnormality of the road surface that was not assumed at the time of the learning cannot be detected. Therefore, it is desired to detect an abnormality of a road surface without learning such an abnormality of a road surface.

SUMMARY

An object of the present disclosure is to provide a road surface abnormality detection apparatus, a road surface abnormality detection method, and a program capable of detecting an abnormality of a road surface without learning such an abnormality of a road surface.

A road surface abnormality detection apparatus according to the present disclosure includes: data acquisition means for acquiring road surface observation data obtained by observing a road surface in a chronological order; prediction means for predicting road surface data at a first timing from a plurality of road surface observation data at a plurality of respective timings earlier than the first timing by using a trained model generated in advance through machine learning; and abnormality detection means for detecting, when a difference between road surface observation data at the first timing and the predicted road surface data at the first timing is equal to or larger than a predetermined threshold, an abnormality of the road surface.

A road surface abnormality detection method according to the present disclosure includes: acquiring road surface observation data obtained by observing a road surface in a chronological order; predicting road surface data at a first timing from a plurality of road surface observation data at a plurality of respective timings earlier than the first timing by using a trained model generated in advance through machine learning; and detecting, when a difference between road surface observation data at the first timing and the predicted road surface data at the first timing is equal to or larger than a predetermined threshold, an abnormality of the road surface.

A program according to the present disclosure causes a computer to implement: a function of acquiring road surface observation data obtained by observing a road surface in a chronological order; a function of predicting road surface data at a first timing from a plurality of road surface observation data at a plurality of respective timings earlier than the first timing by using a trained model generated in advance through machine learning; and a function of detecting, when a difference between road surface observation data at the first timing and the predicted road surface data at the first timing is equal to or larger than a predetermined threshold, an abnormality of the road surface.

BRIEF DESCRIPTION OF DRAWINGS

The above and other aspects, features and advantages of the present disclosure will become more apparent from the following description of certain example embodiments when taken in conjunction with the accompanying drawings, in which:

FIG. 11 is a diagram for explaining a case where a learning process according to the present disclosure is performed at an operation stage;

FIG. 12 is a diagram for explaining a case where a learning process according to the present disclosure is performed at an operation stage;

EXAMPLE EMBODIMENTS

Figure 1:
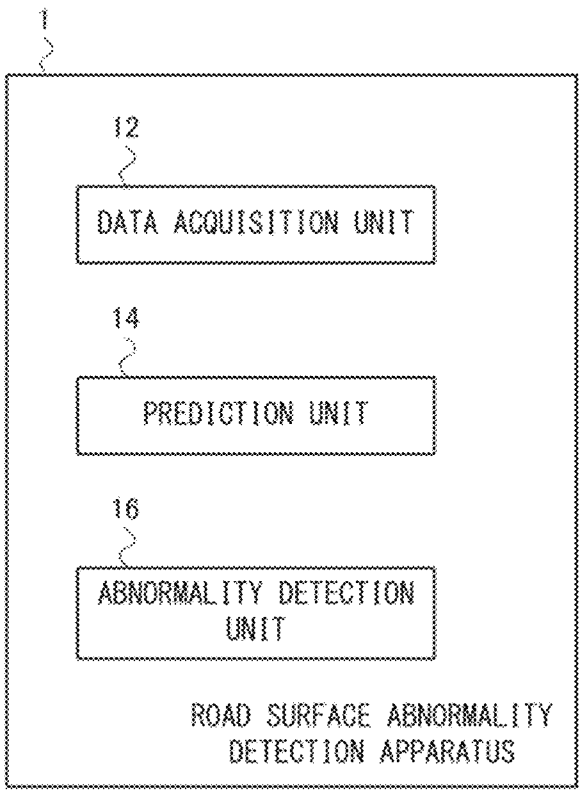
FIG. 1 shows a configuration of a road surface abnormality detection apparatus according to the present disclosure.

An example embodiment will be described hereinafter with reference to the drawings. The following description and the drawings are partially omitted and simplified as appropriate for clarifying the explanation. Further, the same elements are denoted by the same reference numerals (or symbols) throughout the drawings, and redundant descriptions thereof are omitted as appropriate. Further, although the following description is given by using drawings, it does not mean that a drawing used in the description of an example embodiment is applied only to that example embodiment. Each of the drawings may be applied to any of the example embodiments.

First Example Embodiment

FIG. 1 shows a configuration of a road surface abnormality detection apparatus 1 according to the present disclosure. The road surface abnormality detection apparatus 1 includes a data acquisition unit 12, a prediction unit 14, and an abnormality detection unit 16. The data acquisition unit 12 functions as data acquisition means. The prediction unit 14 functions as prediction means. The abnormality detection unit 16 functions as abnormality detection means. The road surface abnormality detection apparatus 1 detects an abnormality of a road surface by these above components.

The road surface abnormality detection apparatus 1 can be implemented by a computer. The road surface abnormality detection apparatus 1 can be implemented by, for example, cloud computing. Alternatively, the road surface abnormality detection apparatus 1 can be implemented by, for example, a plurality of computers that are connected to each other so that they can communicate with each other. Alternatively, each component of the road surface abnormality detection apparatus 1 may be implemented by a plurality of computers in a distributed manner. That is, a computer by which the data acquisition unit 12 is implemented, a computer by which the prediction unit 14 is implemented, and a computer by which the abnormality detection unit 16 is implemented may be computers physically separated from each other. Further, the function of each of a plurality of components may be implemented by a plurality of computers.

In the present disclosure, a "road surface" is an outdoor or indoor surface or passage on which a user or a mobile object can move along. A road surface is, for example, a surface of an outdoor or indoor road, but it is not limited to this example. Further, a user who moves along a road surface may walk or run on the road surface, or may move along the road surface by using aids such as a wheelchair. A mobile object that moves along a road surface may be, for example, a robot or an autonomously traveling mobile object such as a UGV (Unmanned Ground Vehicle), or may be, for example, a mobile object such as an automobile or a bicycle that moves according to user's operations.

Figure 2:
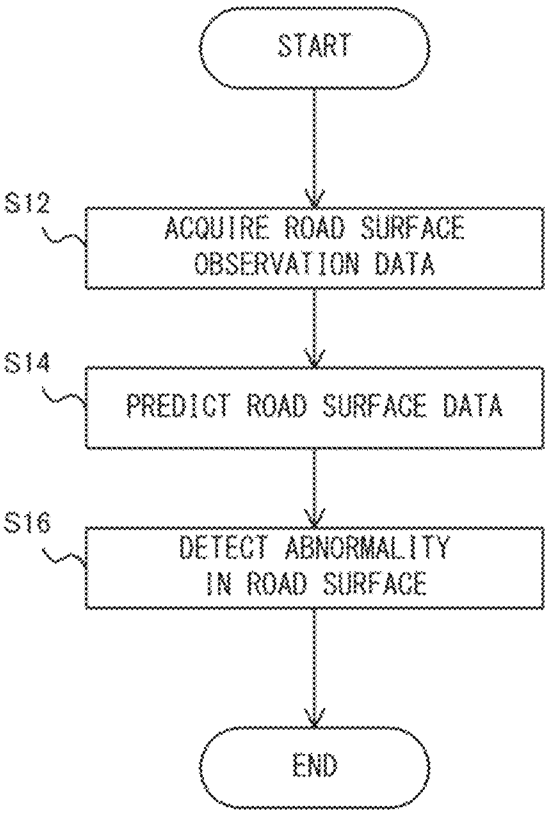
FIG. 2 is a flowchart showing a road surface abnormality detection method performed by the road surface abnormality detection apparatus according to the present disclosure.

FIG. 2 is a flowchart showing a road surface abnormality detection method performed by the road surface abnormality detection apparatus 1 according to the present disclosure. The data acquisition unit 12 acquires road surface observation data (Step S12). Specifically, the data acquisition unit 12 acquires road surface observation data obtained by observing a road surface in a chronological order. In the present disclosure, "road surface observation data" is data obtained by observing a road surface. Such road surface observation data may be obtained by an observation apparatus that moves along a road surface. In this case, the data acquisition unit 12 may acquire road surface observation data which is obtained by observing a road surface in a chronological order by an observation apparatus that moves along the road surface. The type of road surface observation data may vary according to the type of observation apparatus (which will be described later). Note that such an observation apparatus may move with a user or a mobile object which moves along the road surface. Alternatively, such an observation apparatus may move along the road surface independently of a user or a mobile object.

Further, in the present disclosure, an "observation apparatus" is an apparatus that observes the conditions of the road surface. The observation apparatus may be, for example, an imaging apparatus such as a camera. Further, the observation apparatus may be a detection apparatus such as a sensor. Examples of observation apparatuses include an RGB camera, a 3D (three-dimensional) camera such as a depth camera, a 3D laser scanner, and LiDAR (Light Detection and Ranging). Further, examples of observation apparatuses also include an apparatus that measures the inclination of a road surface such as an IMU (Inertial Measurement Unit).

Road surface observation data is data obtained by observing a road surface. Further, road surface observation data is time-series data because it is obtained by observing a road surface in a chronological order (in a time-series manner). That is, road surface observation data can be acquired over time. For example, road surface observation data may be acquired at every observation cycle. Further, for example, road surface observation data may be acquired at every sampling cycle. The type of road surface observation data may vary according to the type of observation apparatus.

The prediction unit 14 predicts road surface data (Step S14). Specifically, the prediction unit 14 predicts road surface data at a first timing from a plurality of road surface observation data at a plurality of respective timings earlier than the first timing by using a trained model generated in advance through machine learning. That is, the prediction unit 14 predicts road surface data at the first timing by inputting a plurality of road surface observation data at a plurality of respective timings earlier than the first timing into the trained model. In other words, the prediction unit 14 generates road surface data at the first timing by inputting a plurality of road surface observation data at a plurality of respective timings earlier than the first timing into the trained model. Note that predicted road surface data may also be hereinafter referred to as "road surface prediction data".

Note that the trained model is generated by, for example, learning its weights (coefficients) according to a machine learning algorithm such as an RNN (Recurrent Neural Network) or an LSTM (Long Short Term Memory). The trained model can be generated by performing machine learning in such a manner that as a plurality of road surface observation data at a plurality of respective timings are entered into the trained model as inputs, road surface data at a timing next to (i.e., immediately after) the last timing of the plurality of timings is output from the trained model. Note that the "trained model generated in advance through machine learning" means a trained model that has been trained to such an extent that the prediction unit 14 can make a prediction at a stage before a prediction. Therefore, it should be noted that the expression "trained model generated in advance through machine learning" does not exclude trained models which (e.g., of which weights) are updated at the inference stage.

The abnormality detection unit 16 detects an abnormality of the road surface (Step S16). Specifically, the abnormality detection unit 16 detects an abnormality of the road surface when a difference between the road surface observation data at the first timing and the predicted road surface data at the first timing is equal to or larger than a predetermined threshold. That is, the abnormality detection unit 16 detects an abnormality of the road surface by comparing the road surface observation data at the first timing with the road surface prediction data at the first timing. Note that the difference between the road surface observation data and the road surface prediction data may be calculated by using, for example, a Loss function (loss function), but it is not limited to this example. The Loss function may be, for example, a minimum squared error (Minimum Squared Error; MSE) or a binary cross entropy (Binary Cross Entropy; BCE).

Further, in the present disclosure, the "abnormality of the road surface" corresponds to a phenomenon that is indicated in road surface observation data so that the difference between the road surface observation data and the road surface prediction data becomes equal to or larger than the threshold as described above. The abnormality of the road surface may be a phenomenon that interferes with the passage of an entity or the like that moves along the road surface. The abnormality of the road surface is, for example, the presence of a level difference, a depression, or an obstacle on the road surface. Further, the threshold can be set so that when there is an abnormality in the road surface, the difference between the road surface observation data and the road surface prediction data becomes equal to or larger than the threshold.

Further, the threshold used for the detection of an abnormality of the road surface may be set according to the attribute of the road surface. Note that the "attribute of the road surface" may include, for example, the environment of the road surface at the timing when the detection of an abnormality is carried out. That is, the "attribute of the road surface" may include, for example, the environment of the road surface at the time when road surface observation data is obtained. In this case, the threshold used for the detection of an abnormality of the road surface may be set according to the environment of the road surface. Note that the "environment of the road surface" may include, for example, time of day and weather. Further, the "attribute of the road surface" may include the attribute of an entity or the like (a user or a mobile object) that moves along the road surface. In this case, the threshold used for the detection of an abnormality of the road surface may be set according to the attribute of the entity or the like that moves along the road surface. Note that the "attribute of an entity or the like that moves along the road surface" may include, for example, the age of the user. Further, the "attribute of an entity or the like that moves along the road surface" may include, for example, the type of the mobile object. The type of mobile object may be, for example, a robot, a UGV, an automobile, or a bicycle.

Further, when road surface observation data is obtained by an observation apparatus that moves along the road surface, the "attribute of road surface" may include, for example, the environment in which the observation apparatus is used. In this case, the threshold used for the detection of an abnormality of the road surface may be set according to the environment in which the observation apparatus is used. The "environment in which the observation apparatus is used" may include, for example, the attribute of the user or the mobile object that moves with the observation apparatus, the state of the area in which the observation apparatus is used, or the time of day at which the observation apparatus is used.

As described above, the road surface abnormality detection apparatus 1 according to the present disclosure predicts, by using a trained model, road surface data at a first timing from a plurality of road surface observation data at a plurality of respective timings earlier than the first timing. Further, the road surface abnormality detection apparatus 1 according to the present disclosure detects an abnormality of the road surface when a difference between the road surface observation data at the first timing and the predicted road surface data at the first timing is equal to or larger than a predetermined threshold. Since the road surface abnormality detection apparatus 1 according to the present disclosure is configured as described above, it can eliminate the need to define abnormal road surfaces and un-abnormal road surfaces, i.e., normal road surfaces, by labels which would otherwise be necessary when a trained model used for the prediction of road surface data is generated. Therefore, the road surface abnormality detection apparatus 1 according to the present disclosure can detect an abnormality of a road surface without learning abnormalities of road surfaces. Therefore, it is possible to detect the presence of what could interfere with the passage on the road surface.

Note that in the case where abnormal road surfaces and normal road surfaces are defined by labels as in the technology disclosed in the aforementioned patent document, the number of patterns of abnormal road surfaces and normal road surfaces may become enormous. Therefore, when abnormal road surfaces and normal road surfaces need to be defined by labels, it is extremely difficult to acquire all the patterns. Therefore, it may not be possible to appropriately train the model to be trained. Further, even when all the patterns of abnormal road surfaces and normal road surfaces can be acquired, it is not easy to perform learning by using all the patterns.

In contrast, no abnormal road surface and no normal road surface are defined by labels in the road surface abnormality detection apparatus 1 according to the present disclosure. The road surface abnormality detection apparatus 1 detects an abnormality of a road surface by predicting road surface data by using a trained model in which no abnormal road surface and no normal road surface are defined by labels, and comparing obtained road surface prediction data with road surface observation data. Therefore, it is possible to detect an abnormality of the road surface without learning abnormalities of road surfaces. Therefore, the road surface abnormality detection apparatus 1 according to the present disclosure can easily and appropriately train the model to be trained used for the prediction of road surface data.

Note that it is also possible to detect an abnormality of a road surface without learning abnormalities of road surfaces by using a road surface abnormality detection method performed by the road surface abnormality detection apparatus 1. Further, it is also possible to detect an abnormality of a road surface without learning abnormalities of road surfaces by using a program for performing a road surface abnormality detection method.

Second Example Embodiment

Next, a second example embodiment will be described with reference to the drawings. The following description and the drawings are partially omitted and simplified as appropriate for clarifying the explanation. Further, the same elements are denoted by the same reference numerals (or symbols) throughout the drawings, and redundant descriptions thereof are omitted as appropriate.

Figure 3:
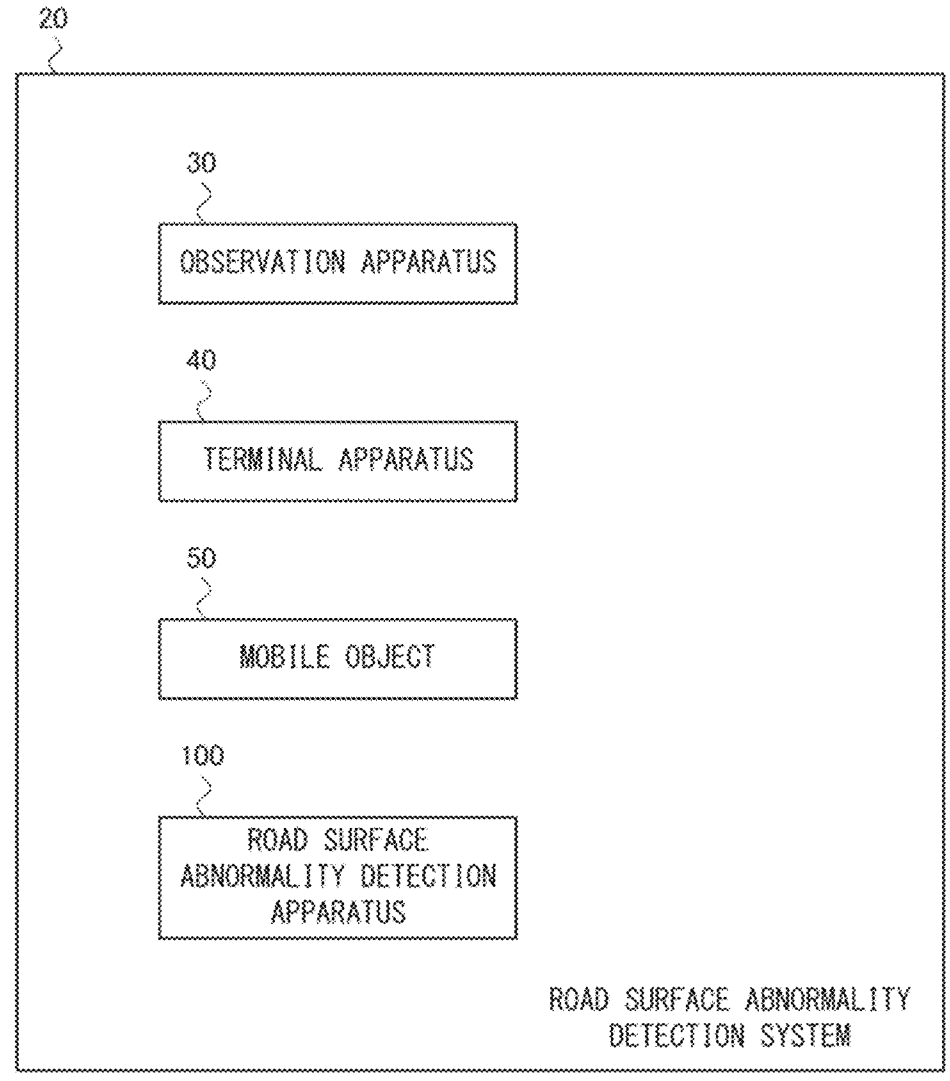
FIG. 3 shows an example of a configuration of a road surface abnormality detection system according to the present disclosure.

FIG. 3 shows an example of a configuration of a road surface abnormality detection system 20 according to the present disclosure. The road surface abnormality detection system 20 includes at least one observation apparatus 30, at least one terminal apparatus 40, at least one mobile object 50, and a road surface abnormality detection apparatus 100. Each of the observation apparatus 30, the terminal apparatus 40, the mobile object 50, and the road surface abnormality detection apparatus 100 functions as, for example, a computer.

The observation apparatus 30, the terminal apparatus 40, the mobile object 50, and the road surface abnormality detection apparatus 100 are connected to each other through a network so that they can communicate with each other. The network may be, for example, a wireless network or a wired network. That is, the road surface abnormality detection apparatus 100 is connected to the observation apparatus 30, the terminal apparatus 40 and the mobile object 50 wirelessly or through a wire. The wireless network may be, for example, a network in conformity with a communication line standard such as LTE (Long Term Evolution) or a network used in a specific area such as WiFi (Registered Trademark) or local 5G. The wired network may be, for example, a LAN (Local Area Network), an optical fiber, or the like.

As described above, the observation apparatus 30 is an apparatus that observes the conditions of a road surface. The observation apparatus 30 may be, for example, an imaging apparatus that photographs a road surface such as a camera. Alternatively, the observation apparatus 30 may be a detection apparatus that detects the conditions of a road surface such as a sensor. The observation apparatus 30 may be, for example, a 3D camera such as an RGB camera or a depth camera, a 3D laser scanner, or LiDAR. Alternatively, the observation apparatus 30 may be an IMU. The observation apparatus 30 may move along the road surface. For example, the observation apparatus 30 may move along the road surface with an entity or the like that moves along the road surface.

Further, the observation apparatus 30 generates a road surface observation result indicating a result of an observation of the conditions of the road surface. The observation apparatus 30 transmits the road surface observation result to the road surface abnormality detection apparatus 100. Further, the observation apparatus 30 may also generate road surface observation data indicating a result of an observation of the conditions of the road surface. In this case, the observation apparatus 30 may transmit the road surface observation data to the road surface abnormality detection apparatus 100. Further, the observation apparatus 30 may also have a positioning function such as GNSS (Global Navigation Satellite System). Further, the observation apparatus 30 may generate a road surface observation result or road surface observation data including information on the place of the observed road surface.

For example, in the case where the observation apparatus 30 is an imaging apparatus, the observation apparatus 30 may generate image data as the road surface observation data. Note that the image data may be data representing a still image or data representing a moving image. Further, the image data may be RGB image data, depth image data, or RGBD image data. Further, in the case where the observation apparatus 30 is, for example, a 3D laser scanner or LiDAR, the observation apparatus 30 may generate 3D point cloud data as the road surface observation data. Further, in the case where the observation apparatus 30 is, for example, an IMU, the observation apparatus 30 may generate IMU data indicating a result of measurement by the IMU as the road surface observation data.

Further, the observation apparatus 30 can generate road surface observation data that changes in a chronological order. For example, when the observation apparatus 30 moves along the road surface while observing the road surface, the observation apparatus 30 may generate road surface observation data that changes from moment to moment as the observation apparatus 30 moves. Further, when the observation apparatus 30 moves along the road surface with an entity or the like that moves along the road surface, the observation apparatus 30 may generate road surface observation data obtained by observing the road surface at or near the place where the entity or the like that moves along the road surface is present. In this case, the observation apparatus 30 may generate road surface observation data that changes from moment to moment as the entity or the like that moves along the road surface moves.

The terminal apparatus 40 is a terminal that a user can carry. For example, the terminal apparatus 40 can be carried by a user who is the entity or the like moving along the road surface. The terminal apparatus 40 shows (e.g., displays) necessary information for the user. The terminal apparatus 40 may be, for example, a smartphone, a mobile phone, a tablet-type terminal, a smartwatch, or a wearable device.

As described above, the mobile object 50 is an apparatus that is the entity or the like moving along the road surface. The mobile object 50 may autonomously travel. Alternatively, the mobile object 50 may move according to user's operations. The mobile object 50 may be, for example, a robot, a UGV, an automobile, or a bicycle.

The road surface abnormality detection apparatus 100 corresponds to the road surface abnormality detection apparatus 1 shown in FIG. 1. The road surface abnormality detection apparatus 100 may be, for example, a server. Alternatively, the road surface abnormality detection apparatus 100 may be, for example, an information terminal. Alternatively, the road surface abnormality detection apparatus 100 may be implemented by, for example, cloud computing. Alternatively, the road surface abnormality detection apparatus 100 can be implemented by, for example, a plurality of computers which are connected to each other so that they can communicate with each other. Further, each component of the road surface abnormality detection apparatus 100 (which will be described later) may be implemented by a plurality of computers.

Note that a plurality of arbitrary apparatuses constituting the road surface abnormality detection system 20 may be configured in a physically integrated manner. For example, the observation apparatus 30 and the terminal apparatus 40 may be physically integrated with each other. Alternatively, the observation apparatus 30 and the road surface abnormality detection apparatus 100 may be physically integrated with each other. Alternatively, the terminal apparatus 40 and the road surface abnormality detection apparatus 100 may be physically integrated with each other. Alternatively, the observation apparatus 30 and the mobile object 50 may be physically integrated with each other. Alternatively, the mobile object 50 and the road surface abnormality detection apparatus 100 may be physically integrated with each other. Alternatively, the observation apparatus 30, the terminal apparatus 40, and the road surface abnormality detection apparatus 100 may be physically integrated with each other. Alternatively, the observation apparatus 30, the mobile object 50, and the road surface abnormality detection apparatus 100 may be physically integrated with each other.

Figure 4:
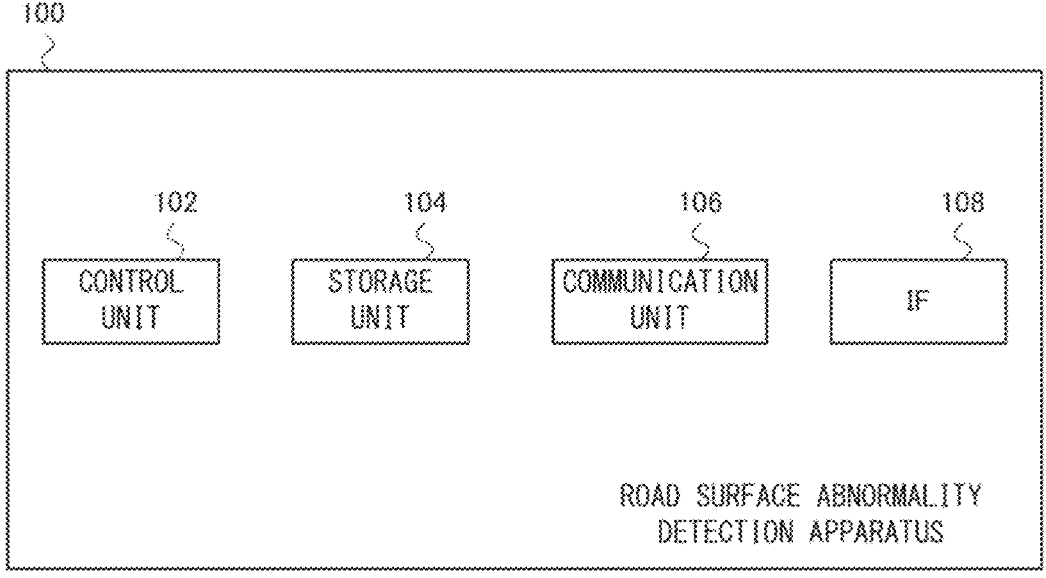
FIG. 4 shows an example of a hardware configuration of the road surface abnormality detection apparatus according to the present disclosure.

FIG. 4 shows an example of a hardware configuration of the road surface abnormality detection apparatus 100 according to the present disclosure. As shown in FIG. 4, the road surface abnormality detection apparatus 100 includes, as its main hardware configuration, a control unit 102, a storage unit 104, a communication unit 106, and an interface (IF; Interface) unit 108. The control unit 102, the storage unit 104, the communication unit 106, and the interface unit 108 are connected to each other through a data bus or the like. Note that each of the above-described observation apparatus 30, the terminal apparatus 40, and the mobile object 50 may also have a hardware configuration identical to that of the road surface abnormality detection apparatus 100 shown in FIG. 4.

The control unit 102 is, for example, a processor such as a CPU (Central Processing Unit). The control unit 102 functions as an arithmetic apparatus that performs control processing, arithmetic processing, and the like. Note that the control unit 102 may include a plurality of processors. The storage unit 104 may be a storage device such as a memory or a hard disk drive. The storage unit 104 may be, for example, a ROM (Read Only Memory) or a RAM (Random Access Memory). The storage unit 104 has a function of storing a control program, an arithmetic program, and the like executed by the control unit 102. That is, the storage unit 104, which is a memory or the like, stores at least one instruction. Further, the storage unit 104 has a function of temporarily storing processing data and the like. The storage unit 104 may include a database. Further, the storage unit 104 may include a plurality of memories.

The communication unit 106 performs processing necessary for the road surface abnormality detection apparatus 100 to communicate with other apparatuses through the network. The communication unit 106 may include communication ports, a router, a firewall, and the like. The interface (IF; Interface) unit 108 is, for example, a user interface (UI). The interface unit 108 includes an input device such as a keyboard, a touch panel, or a mouse, and an output device such as a display device or a speaker. The interface unit 108 may be configured so that, for example, the input device and the output device are integrated with each other, like a touch screen or a touch panel. The interface unit 108 receives an operation for inputting data performed by a user such as an operator or a worker, and outputs information to the user. The interface unit 108 may output information about an abnormality of a road surface. Further, the interface unit 108 may also output information indicating a trained model.

Figure 5:
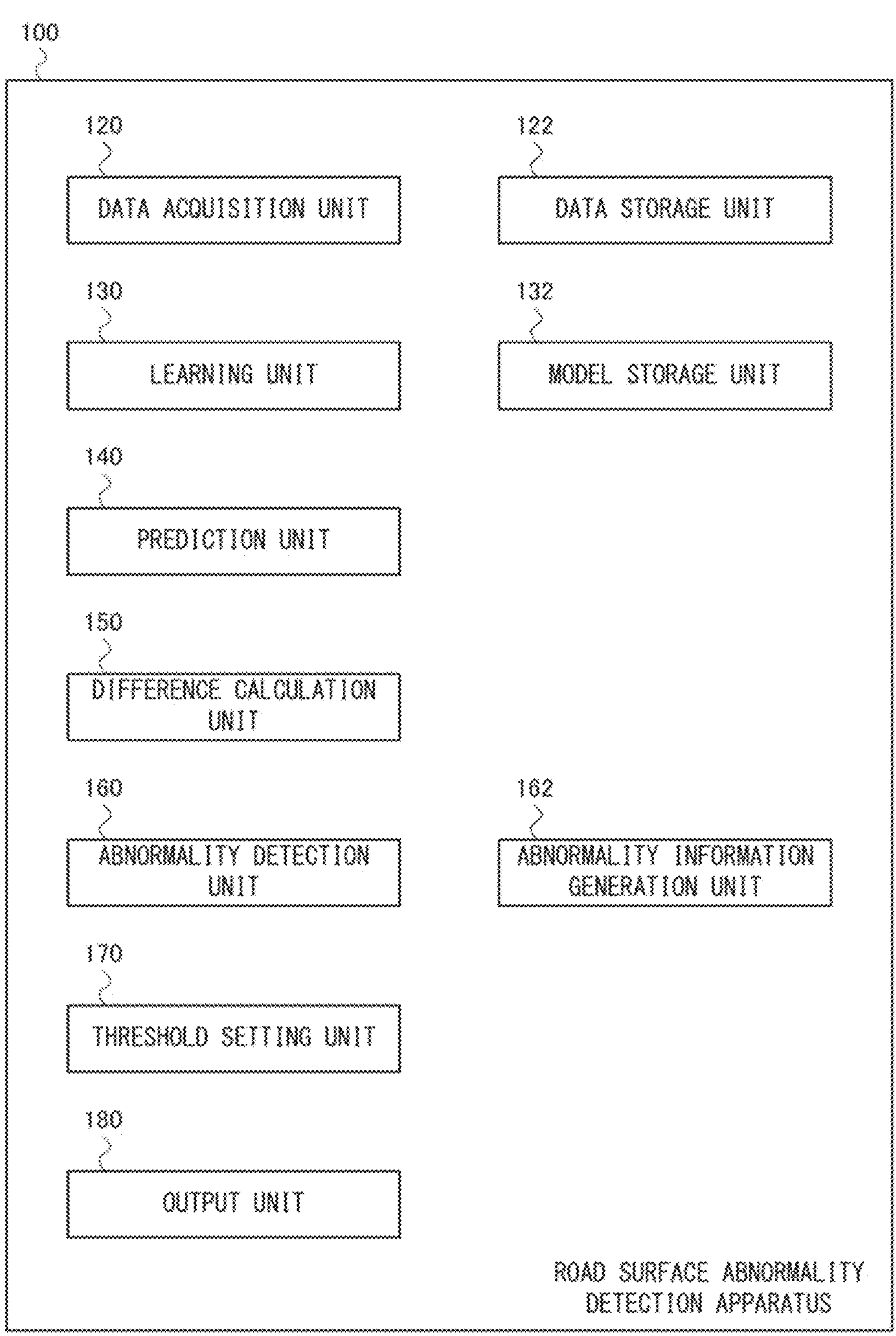
FIG. 5 shows an example of a functional configuration of the road surface abnormality detection apparatus according to the present disclosure.

FIG. 5 shows an example of a functional configuration of the road surface abnormality detection apparatus 100 according to the present disclosure. The road surface abnormality detection apparatus 100 includes, as its components, a data acquisition unit 120, a data storage unit 122, a learning unit 130, and a model storage unit 132. Further, the road surface abnormality detection apparatus 100 includes, as its components, a prediction unit 140, a difference calculation unit 150, an abnormality detection unit 160, an abnormality information generation unit 162, a threshold setting unit 170, and an output unit 180. The road surface abnormality detection apparatus 100 detects an abnormality of a road surface by these components. Further, the road surface abnormality detection apparatus 100 performs processing for outputting information about an abnormality of a road surface by these components.

Note that as described above, the road surface abnormality detection apparatus 100 does not necessarily have to be formed by one physical apparatus. In this case, each of the above-described components may be implemented by a plurality of apparatuses physically separated from each other. This fact also applies to other example embodiments described later.

The data acquisition unit 120 functions as data acquisition means. The data storage unit 122 functions as data storage means. The learning unit 130 functions as learning means. The model storage unit 132 functions as model storage means. The prediction unit 140 functions as prediction means. The difference calculation unit 150 functions as difference calculation means. The abnormality detection unit 160 functions as abnormality detection means. The abnormality information generation unit 162 functions as abnormality information generation means. The threshold setting unit 170 functions as threshold setting means. The output unit 180 functions as output means.

Note that each of the above-described components can be implemented by, for example, executing a program under the control of the control unit 102. More specifically, each component can be implemented by having the control unit 102 execute a program (instructions) stored in the storage unit 104. Alternatively, each component may be implemented by recording a necessary program on an arbitrary nonvolatile recording medium in advance and installing the program as required. Further, the implementation of each component is not limited to the software implementation by a program. That is, each component may be implemented by any combination of two or more of hardware, firmware, and software. Further, each component may be implemented by using a user-programmable integrated circuit such as an FPGA (field-programmable gate array) or a microcomputer. In this case, a program for implementing each of the above-described components may be implemented (i.e., executed) by using the above-described integrated circuit. These facts also apply to other example embodiments described later.

The data acquisition unit 120 corresponds to the above-described data acquisition unit 12. The data acquisition unit 120 acquires road surface observation data obtained by observing the road surface in a chronological order. The data acquisition unit 120 may be implemented by the communication unit 106. The data acquisition unit 120 may receive road surface observation data generated by the observation apparatus 30 from the observation apparatus 30. Further, the data acquisition unit 120 may acquire road surface observation data by the observation apparatus 30 that moves along the road surface.

Further, the data acquisition unit 120 may generate road surface observation data by using a road surface observation result received from the observation apparatus 30. For example, the data acquisition unit 120 may generate a normal vector map (normal vector data) indicating the normal vector of each of microscopic planes on the road surface as road surface observation data by using depth image data or 3D point cloud data received from the observation apparatus 30. The normal vector map may indicate an inclination from the vertical direction at each point on the road surface. Note that the normal vector map may show the shape of the road surface. Further, an abnormality of a road surface which would interfere with the passage often appears as a change in the shape of the road surface. Therefore, it is possible to perform a process for detecting an abnormality of the road surface more appropriately by generating a normal vector map as road surface observation data.

Further, the data acquisition unit 120 acquires road surface observation data, which is time-series data, over time. For example, the data acquisition unit 120 may acquire road surface observation data every time the observation apparatus 30 generates a road surface observation result or road surface observation data. Further, the data acquisition unit 120 may acquire road surface observation data, for example, at a predetermined cycle. For example, the data acquisition unit 120 may acquire road surface observation data at every observation cycle of the observation apparatus 30. Further, the data acquisition unit 120 may acquire road surface observation data, for example, at every sampling cycle. Further, in the case where the observation apparatus 30 is an imaging apparatus, the data acquisition unit 120 may acquire road surface observation data based on FPS (Flames Per Second; frame rate).

The data storage unit 122 stores the road surface observation data acquired by the data acquisition unit 120. The data storage unit 122 may be implemented by the storage unit 104. The data storage unit 122 stores a plurality of road surface observation data in a chronological order. Note that a set of a plurality of road surface observation data in a chronological order may be data that changes over time, such as moving image data. In other words, the road surface observation data changes in a chronological order. Therefore, each of the plurality of road surface observation data in a chronological order can be considered to be frame data indicating the conditions of the road surface at a corresponding time. That is, the data storage unit 122 stores a plurality of frame data. In this case, the data acquisition unit 120 may acquire road surface observation data which is frame data obtained at a certain timing. That is, the data acquisition unit 120 may acquire frame data at a certain timing at a predetermined cycle. That is, the data acquisition unit 120 may acquire frame data corresponding to frames constituting a set of a plurality of road surface observation data that change in a chronological order.

The learning unit 130 generates a trained model used in the prediction unit 140 (which will be described later). The learning unit 130 generates a trained model according to a machine learning algorithm in which time-series data is used as inputs. For example, the learning unit 130 generates a trained model according to a machine learning algorithm such as an RNN or an LSTM. Specifically, the learning unit 130 learns weights in the trained model according to a machine learning algorithm.

The learning unit 130 learns weights of a trained model in such a manner that as a plurality of road surface observation data, which is time-series data, are entered into the trained model as inputs, road surface prediction data is output from the trained model. Specifically, the learning unit 130 performs machine learning in such a manner that as a plurality of road surface observation data at a plurality of respective timings are entered into the trained model as inputs, road surface data at a timing next to (i.e., immediately after) the last timing of the plurality of timings is output from the trained model. Note that the "road surface data at the next timing" corresponds to road surface prediction data at the "next timing". More specifically, the learning unit 130 learns weights of the trained model in such a manner that as the value (component value) of each of elements of each of a plurality of vectors (input vectors) representing a plurality of respective road surface observation data are entered into the trained model as inputs, each of component values of a vector (output vector) representing road surface prediction data is output from the trained model. Note that in the case where the road surface observation data is image data, the input vector may have the values (pixel values) of the pixels of the road surface observation data as its component values. Similarly, in the case where the road surface prediction data is image data, the output vector may have the values (pixel values) of the pixels of the road surface prediction data as its component values. In this case, the learning unit 130 may learn weights of the trained model in such a manner that as a vector having the pixel values of the pixels of the road surface observation data as its component values are entered into the trained model as inputs, a vector having the pixel values of the pixels of the road surface prediction data as its component values is output from the trained model. In this way, the learning unit 130 generates the trained model. Note that as described later, the learning unit 130 may generate (update) the trained model through online learning at the inference stage. Further, the learning unit 130 may update the weights of the trained model at the inference stage. Alternatively, the learning unit 130 may not update the weights of the trained model at the inference stage.

The model storage unit 132 stores data representing the trained model generated by the learning unit 130. The model storage unit 132 may be implemented by the storage unit 104. The model storage unit 132 may store data indicating the weights of the trained model learned by the learning unit 130.

Figure 6:
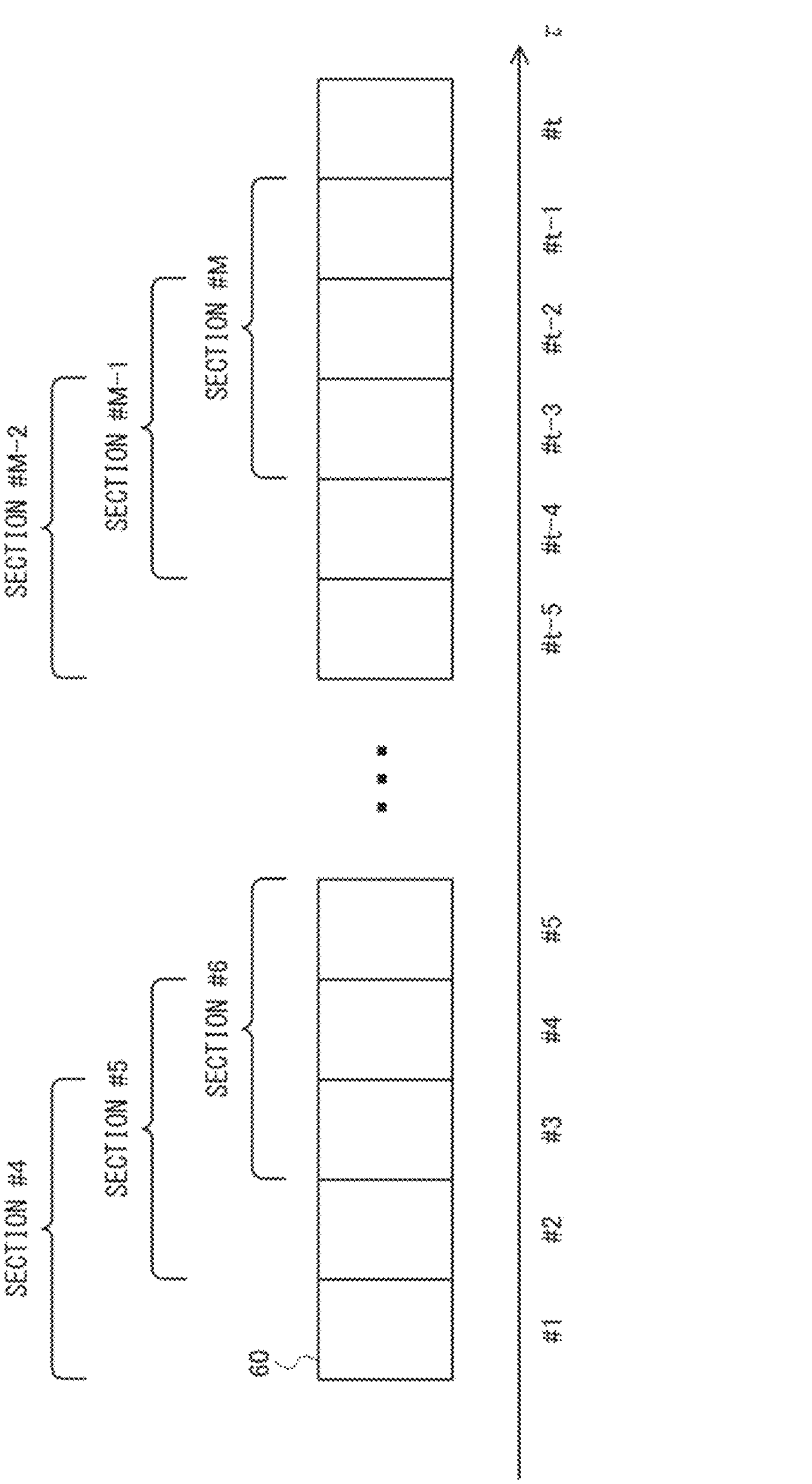
FIG. 6 is a diagram for explaining road surface observation data according to the present disclosure.

FIG. 6 is a diagram for explaining road surface observation data according to the present disclosure. In FIG. 6, road surface observation data 60 composed of a plurality of frame data, which are time-series data, is shown. Note that in FIG. 6, the horizontal axis indicates time t. The time t corresponds to the timing when a road surface observation result corresponding to road surface observation data 60, which is composed of frame data, is obtained. That is, the time t corresponds to the timing when the observation apparatus 30 observed the road surface. In FIG. 6, road surface observation data 60, which is composed of frame data obtained at times #1 to #5, and road surface observation data 60, which is composed of frame data obtained at times #t-5 to #t, are shown. Note that when the road surface observation data shown in FIG. 6 is used in the learning process, it is assumed that the road surface observation data shown in FIG. 6 are all data obtained by observing a normal road surface.

The learning unit 130 trains the trained model in such a manner that as road surface observation data 60 composed of N frame data obtained in a chronological order are entered into the trained model as inputs, road surface data at a time t next to (i.e., immediately after) the time t of the last road surface observation data of the N pieces of road surface observation data 60 is output from the trained model. That is, the learning unit 130 trains the trained model in such a manner that it enters road surface observation data 60 of a section including N frame data into the trained model as an input, and thereby predicts frame data at a time t next to the last time t of the section. Note that although Nis three (N=3) in the example shown in FIG. 6, N is not limited to three. Further, a plurality of road surface observation data included in one section may be successively acquired road surface observation data.

In the example shown in FIG. 6, road surface observation data 60 which is composed of frame data at times #1 to #3 is included in a section #4. Road surface observation data 60 which is composed of frame data at times #2 to #4 is included in a section #5. Road surface observation data 60 which is composed of frame data at times #3 to #5 is included in a section #6. Road surface observation data 60 which is composed of frame data at times #t-5 to #t-3 is included in a section #M-2. Road surface observation data 60 which is composed of frame data at times #t-4 to #t-2 is included in a section #M-1. Road surface observation data 60 which is composed of frame data at times #t-3 to #t-1 is included in a section #M. Note that in the example shown in FIG. 6, two frame data overlap each other in two road surface observation data 60 in sections adjacent to each other, but the number of frame data that overlap each other in two road surface observation data 60 in sections adjacent to each other is not limited to two. In other words, in the example shown in FIG. 6, the amount of the shift between road surface observation data 60 in sections adjacent to each other is one frame data, but the amount of the shift between road surface observation data 60 in sections adjacent to each other is not limited to one frame data. For example, in the case where road surface observation data 60 which is composed of frame data at times #t-3 to #t-1 may be included in the section #M, road surface observation data 60 which is composed of frame data at times #t-5 to #t-3 may be included in the section #M-1.

A case where the learning unit 130 performs machine learning by using the road surface observation data 60 shown in FIG. 6 will be described hereinafter. The learning unit 130 adjusts the weights of the trained model in such a manner that it enters road surface observation data 60 of the section #4 into the trained model as an input, and thereby predicts road surface data at a time #4 next to the last time #3 of the plurality of times #1 to #3 in the section #4. That is, the learning unit 130 adjusts the weights of the trained model in such a manner that it enters road surface observation data 60 which is composed of the plurality of frame data in the section #4 into the trained model as an input, and thereby predicts road surface data at the time #4 by using the road surface observation data 60 at the time #4 as correct answer data (ground truth data).

The learning unit 130 adjusts the weights of the trained model in such a manner that it enters road surface observation data 60 of the section #5 into the trained model as an input, and thereby predicts road surface data at a time #5 next to the last time #4 of the plurality of times #2 to #4 in the section #5. That is, the learning unit 130 adjusts the weights of the trained model in such a manner that it enters road surface observation data 60 which is composed of the plurality of frame data in the section #5 into the trained model as an input, and thereby predicts road surface data at the time #5 by using the road surface observation data 60 at the time #5 as correct answer data.

The learning unit 130 adjusts the weights of the trained model in such a manner that it enters road surface observation data 60 of the section #6 into the trained model as an input, and thereby predicts road surface data at a time #6 next to the last time #5 of the plurality of times #3 to #5 in the section #6. That is, the learning unit 130 adjusts the weights of the trained model in such a manner that it enters road surface observation data 60 which is composed of the plurality of frame data in the section #6 into the trained model as an input, and thereby predicts road surface data at the time #6 by using the road surface observation data 60 at the time #6 as correct answer data.

The learning unit 130 adjusts the weights of the trained model in such a manner that it enters road surface observation data 60 of the section #M-2 into the trained model as an input, and thereby predicts road surface data at a time #t-2 next to the last time #t-3 of the plurality of times #t-5 to #t-3 in the section #M-2. That is, the learning unit 130 adjusts the weights of the trained model in such a manner that it enters road surface observation data 60 which is composed of the plurality of frame data in the section #M-2 into the trained model as an input, and thereby predicts road surface data at the time #t-2 by using the road surface observation data 60 at the time #t-2 as correct answer data.

The learning unit 130 adjusts the weights of the trained model in such a manner that it enters road surface observation data 60 of the section #M-1 into the trained model as an input, and thereby predicts road surface data at a time #t-1 next to the last time #t-2 of the plurality of times #t-4 to #t-2 in the section #M-1. That is, the learning unit 130 adjusts the weights of the trained model in such a manner that it enters road surface observation data 60 which is composed of the plurality of frame data in the section #M-1 into the trained model as an input, and thereby predicts road surface data at the time #t-1 by using the road surface observation data 60 at the time #t-1 as correct answer data.

The learning unit 130 adjusts the weights of the trained model in such a manner that it enters road surface observation data 60 of the section #M into the trained model as an input, and thereby predicts road surface data at a time #t next to the last time #t-1 of the plurality of times #t-3 to #t-1 in the section #M. That is, the learning unit 130 adjusts the weights of the trained model in such a manner that it enters road surface observation data 60 which is composed of the plurality of frame data in the section #M into the trained model as an input, and thereby predicts road surface data at the time #t by using the road surface observation data 60 at the time #t as correct answer data.

Note that the learning unit 130 may perform the above-described learning process at the learning stage, and may not perform the learning process at the operation stage (inference stage). Note that the "operation stage" refers to the stage at which a prediction process and a road surface abnormality detection process are performed by using the trained model. In this case, the road surface abnormality detection apparatus 100 may not include the learning unit 130. That is, the learning unit 130 may be provided in an apparatus different from the road surface abnormality detection apparatus 100. In this case, the weights of the trained model generated by the learning unit 130 at the learning stage may be fixed (i.e., unchanged) at the operation stage.

Alternatively, the learning unit 130 may also perform the learning process at the operation stage. The learning unit 130 may perform an incremental learning process or an online learning process. That is, the learning unit 130 may perform machine learning every time road surface observation data is acquired and thereby update the weights of the trained model. In other words, when road surface observation data is acquired, the learning unit 130 may perform machine learning by using the acquired road surface observation data. In this process, the learning unit 130 may perform learning process by using the acquired road surface observation data and N road surface observation data acquired before the acquisition of the road surface observation data. That is, the learning unit 130 may perform learning process by using the acquired road surface observation data as correct answer data, and using N road surface observation data acquired before the acquisition of the road surface observation data as input data.

Further, when the learning unit 130 performs the learning process at the operation stage, it may perform machine learning by using road surface observation data for which no abnormality is detected in the abnormality detection process performed by the abnormality detection unit 160 (which will be described later). That is, the learning unit 130 may update the weights of the trained model by performing machine learning by using road surface observation data of which the difference from the predicted road surface data is smaller than a threshold. By doing so, it is possible to fine-tune the trained model. Note that the learning unit 130 may perform machine learning by using road surface observation data for which no abnormality is detected in the abnormality detection process every time no abnormality is detected in the abnormality detection process. In this process, the learning unit 130 may perform learning process by using road surface observation data for which no abnormality is detected and N road surface observation data for which no abnormality is detected before the acquisition of the road surface observation data. That is, the learning unit 130 may perform the learning process by using road surface observation data for which no abnormality is detected as correct answer data, and using N road surface observation data for which no abnormality is detected before the acquisition of the road surface observation data as input data.

The prediction unit 140 corresponds to the above-described prediction unit 14. The prediction unit 140 predicts road surface data by using the trained model stored in the model storage unit 132. Specifically, similarly to the prediction unit 14, the prediction unit 140 predicts, by using the trained model, road surface data at a first timing from a plurality of road surface observation data at a plurality of respective timings earlier than the first timing. In other words, the prediction unit 140 predicts road surface data at the first timing by inputting a plurality of road surface observation data at a plurality of respective timings earlier than the first timing into the trained model. In still other words, the prediction unit 140 generates road surface data at the first timing by inputting a plurality of road surface observation data at a plurality of respective timings earlier than the first timing into the trained model.

A case in which the prediction unit 140 performs a prediction process by using the road surface observation data 60 shown in FIG. 6 will be described. The prediction unit 140 predicts road surface data at the time #4 next to the last time #3 in the section #4 by using the road surface observation data 60 of the section #4. In this case, the "time #4" corresponds to the above-described "first timing". Specifically, the prediction unit 140 generates road surface prediction data at the time #4 by using the trained model and the road surface observation data 60 of the section #4. More specifically, the prediction unit 140 generates road surface prediction data at the time #4 by inputting the road surface observation data 60 of the section #4 into the trained model and thereby acquiring road surface data at the time #4 output from the trained model.

The prediction unit 140 predicts road surface data at the time #5 next to the last time #4 in the section #5 by using the road surface observation data 60 of the section #5. In this case, the "time #5" corresponds to the above-described "first timing". Specifically, the prediction unit 140 generates road surface prediction data at the time #5 by using the trained model and the road surface observation data 60 of the section #5. More specifically, the prediction unit 140 generates road surface prediction data at the time #5 by inputting the road surface observation data 60 of the section #5 into the trained model and thereby acquiring road surface data at the time #5 output from the trained model.

The prediction unit 140 predicts road surface data at the time #t-2 next to the last time #t-3 in the section #M-2 by using the road surface observation data 60 of the section #M-2. In this case, the "time #t-2" corresponds to the above-described "first timing". Specifically, the prediction unit 140 generates road surface prediction data at the time #t-2 by using the trained model and the road surface observation data 60 of the section #M-2. More specifically, the prediction unit 140 generates road surface prediction data at the time #t-2 by inputting the road surface observation data 60 of the section #M-2 into the trained model and thereby acquiring road surface data at the time #t-2 output from the trained model.

The prediction unit 140 predicts road surface data at the time #t-1 next to the last time #t-2 in the section #M-1 by using the road surface observation data 60 of the section #M-1. In this case, the "time #t-1" corresponds to the above-described "first timing". Specifically, the prediction unit 140 generates road surface prediction data at the time #t-1 by using the trained model and the road surface observation data 60 of the section #M-1. More specifically, the prediction unit 140 generates road surface prediction data at the time #t-1 by inputting the road surface observation data 60 of the section #M-1 into the trained model and thereby acquiring road surface data at the time #t-1 output from the trained model.

The prediction unit 140 predicts road surface data at the time #t next to the last time #t-1 in the section #M by using the road surface observation data 60 of the section #M. In this case, the "time #t" corresponds to the above-described "first timing". Specifically, the prediction unit 140 generates road surface prediction data at the time #t by using the trained model and the road surface observation data 60 of the section #M. More specifically, the prediction unit 140 generates road surface prediction data at the time #t by inputting the road surface observation data 60 of the section #M into the trained model and thereby acquiring road surface data at the time #t output from the trained model.

The difference calculation unit 150 calculates a difference between the road surface observation data 60 at the first timing and the road surface prediction data at the first timing. That is, the difference calculation unit 150 compares the road surface observation data 60 and the road surface prediction data at each timing, and thereby calculates a difference between the road surface observation data 60 and the road surface prediction data at each timing. The difference calculation unit 150 may calculate the difference by using, for example, a Loss function such as a minimum squared error or a binary cross entropy, but the calculation is not limited to this example. The difference calculation unit 150 may calculate, as the difference, a value that is output from a Loss function when the component values of a vector representing the road surface observation data 60 and those of a vector representing the road surface prediction data are into the Loss function. Further, in the case where the road surface observation data is image data, the difference calculation unit 150 may calculate the difference between the road surface observation data and the road surface prediction data by calculating the difference (deviation) between the pixel values of pixels of the road surface observation data and those of corresponding pixels of the road surface prediction data by using the Loss function.

The abnormality detection unit 160 corresponds to the above-described abnormality detection unit 16. The abnormality detection unit 160 detects an abnormality of the road surface when the difference calculated by the difference calculation unit 150 is equal to or larger than a predetermined threshold. That is, the abnormality detection unit 160 detects an abnormality of the road surface at the first timing when the difference between the road surface observation data at the first timing and the road surface prediction data at the first timing is equal to or larger than a predetermined threshold. Specifically, the abnormality detection unit 160 determines whether the difference between the road surface observation data at the first timing and the road surface prediction data at the first timing is equal to or larger than a predetermined threshold. More specifically, the abnormality detection unit 160 determines whether an output value that is obtained by inputting the road surface observation data at the first timing and the road surface prediction data at the first timing into the Loss function is equal to or larger than a predetermined threshold. The abnormality detection unit 160 detects an abnormality of the road surface at the first timing when the difference is equal to or larger than a threshold. On the other hand, the abnormality detection unit 160 determines that the road surface at the first timing is normal when the difference is smaller than the threshold. Note that the threshold may be set by the threshold setting unit 170 (which will be described later).

When an abnormality of the road surface is detected, the abnormality information generation unit 162 generates road surface abnormality information which is information indicating the abnormality of the road surface. The abnormality information generation unit 162 may generate, for example, road surface abnormality information indicating that an abnormality of the road surface has been detected. Further, the abnormality information generation unit 162 may generate, for example, road surface abnormality information including information on the place where the road surface observation data in which the abnormality of the road surface has been detected was observed. Further, the abnormality information generation unit 162 may generate, for example, road surface abnormality information in which a symbol indicating a place where the abnormality has been detected is displayed on a map on which the road surface is shown.

Further, the abnormality information generation unit 162 may generate, for example, road surface abnormality information indicating an abnormal part of the road surface. The abnormality information generation unit 162 may generate, for example, road surface abnormality information indicating an abnormal part in road surface observation data. Note that in the case where the road surface observation data is image data, the road surface abnormality information may be information indicating an abnormal part in the image data. Note that the abnormal part may correspond to, among the pixels of the road surface observation data, a pixel(s) of which the difference between the pixel value of the pixel of the road surface observation data and that of the corresponding pixel of the road surface prediction data is equal to or larger than a threshold.

Further, the abnormality information generation unit 162 may generate road surface abnormality information indicating the type of the detected abnormality. Specifically, the abnormality information generation unit 162 may determine the type of the abnormality by using a trained model that has been trained so that it outputs, when data (such as image data) indicating a detected abnormal part is input thereto, the type of an abnormality at the abnormal part. For example, the abnormality information generation unit 162 may determine the type of the abnormality by using a trained model that has been trained so that it outputs, when image data in which an image of a detected abnormal part (an image of a part of the road surface observation data) is shown is input, the type of an object shown in the image. In this case, the type of the abnormality may be determined, for example, according to a machine learning algorithm for performing ordinary image recognition. Note that in this case, after an abnormality of the road surface is detected, the type of the abnormality is determined. Therefore, it is possible to accurately determine the type of the abnormality in a robust manner compared with the technology in which an abnormality of a road surface is determined by defining all the situations of road surfaces by labels as in Patent Literature 1.

Figure 7:
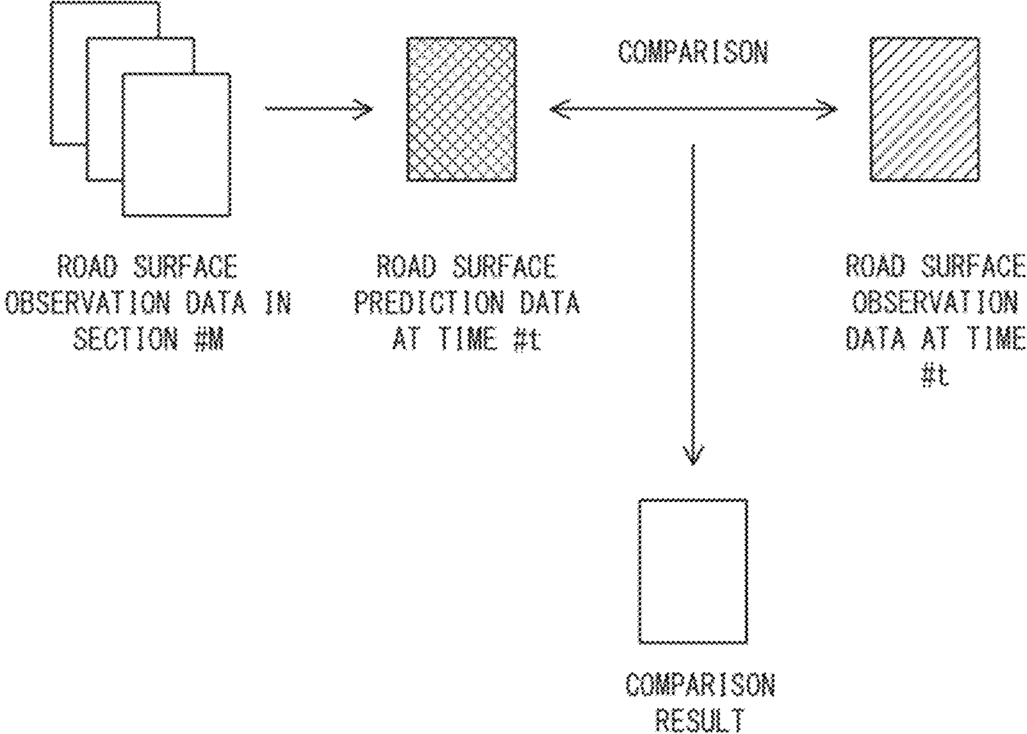
FIG. 7 is a diagram for explaining a process for detecting an abnormality of a road surface according to the present disclosure.

FIG. 7 is a diagram for explaining a process for detecting an abnormality of a road surface according to the present disclosure. FIG. 7 shows a case where a process for detecting an abnormality of a road surface is performed at a time #t. The prediction unit 140 generates road surface prediction data at the time #t by using road surface observation data in a section #M earlier than the time #t, composed of a predetermined number N of road surface observation data. The difference calculation unit 150 compares the road surface prediction data at the time #t with the road surface observation data at the time #t, and thereby calculates a difference therebetween. Then, the abnormality detection unit 160 generates a comparison result according to the calculated difference. When the difference is equal to or larger than a threshold, the abnormality detection unit 160 generates a comparison result indicating that an abnormality of the road surface has been detected. On the other hand, when the difference is smaller than the threshold, the abnormality detection unit 160 generates a comparison result indicating that the road surface is normal.

The threshold setting unit 170 sets the threshold used in the difference calculation unit 150. The threshold setting unit 170 sets the threshold so that the difference between the road surface observation data and the road surface prediction data becomes equal to or larger than the threshold when there is a phenomenon in the road surface that interferes with the passage of an entity or the like that moves along the road surface. Note that the threshold setting unit 170 may set the threshold according to the attribute of the road surface as described above. Further, the abnormality detection unit 160 may detect an abnormality of the road surface by using the threshold, which is set according to the attribute of the road surface. By the above-described configuration, it is possible to appropriately determine whether or not the abnormality interferes with the passage according to the attribute of the road surface.

The threshold setting unit 170 may set, when the attribute of the road surface is input to the interface unit 108, the threshold according to the input attribute of the road surface. The threshold setting unit 170 may set the threshold in such a manner that the more the attribute of the road surface makes the passage of the entity or the like on the road surface difficult, the smaller value it sets the threshold to. For example, the threshold setting unit 170 may set the threshold in such a manner that the more the attribute of the road surface raises the possibility that the entity or the like moving along the road surface falls down, the smaller value it sets the threshold to. In this way, it is possible to prevent the entity or the like moving along the road surface from falling down.

The threshold setting unit 170 may set the threshold, for example, according to the age of a user who moves along the road surface. When the age of the user is input to the interface unit 108, the threshold setting unit 170 may set the threshold according to the input age of the user. For example, when the age of a user who moves along the road surface is high, the possibility that the user falls down is, compared with those of young users, high due to the decrease in the user's athletic ability even when the abnormality in the road surface is small. Therefore, the threshold setting unit 170 may set the threshold to a small value when the age of the user who moves along the road surface is high. In this way, it is possible to prevent even a user who is prone to fall down from falling down.

Further, the threshold setting unit 170 may set the threshold, for example, according to the type of a mobile object 50 that moves along the road surface. When the type of the mobile object 50 is input to the interface unit 108, the threshold setting unit 170 may set the threshold according to the type of the input mobile object 50. For example, when the mobile object 50 that moves along the road surface is one that is prone to fall down (e.g., overturn), the threshold setting unit 170 may set the threshold to a small value. In this way, it is possible to prevent even a mobile object 50 which is prone to fall down from falling down.

Further, the threshold setting unit 170 may set the threshold, for example, according to the environment of the road surface. The threshold setting unit 170 may set the threshold, for example, according to, the time of day at which the abnormality detection process is performed. When the time of day is input to the interface unit 108, the threshold setting unit 170 may set the threshold according to the input time of day. For example, in the night time, the visibility of the road surface deteriorates compared with that in the day time, so that the possibility that an entity or the like that moves along the road surface falls down increases even when the abnormality in the road surface is small. Therefore, the threshold setting unit 170 may set the threshold to a small value in the time of day at which it is dark outside. In this way, it is possible to prevent the entity or the like moving along the road surface from falling down even in the time of day at which it is dark outside.

Further, the threshold setting unit 170 may set the threshold, for example, according to the weather under which the abnormality detection process is performed. When the weather is input to the interface unit 108, the threshold setting unit 170 may set the threshold according to the input weather. For example, in a rainy weather environment, the visibility and the conditions of the road surface deteriorate compared with those in a fine weather environment, so that the possibility that an entity or the like that moves along the road surface falls down increases even when the abnormality in the road surface is small. Therefore, the threshold setting unit 170 may set the threshold to a small value in rainy weather. In this way, it is possible to prevent an entity or the like moving along the road surface from falling down even in wet weather.

When an abnormality of the road surface is detected, the output unit 180 performs a process so as to output road surface abnormality information indicating that the abnormality of the road surface has been detected. The output unit 180 may perform a process so as to make the terminal apparatus 40 output the road surface abnormality information. In this case, the output unit 180 may perform a process for transmitting the road surface abnormality information and an instruction for outputting the road surface abnormality information to the terminal apparatus 40. In this case, the output unit 180 may be implemented by the communication unit 106. Further, the output unit 180 may perform a process so as to make the interface unit 108 output the road surface abnormality information.

The output unit 180 may perform a process so as to output road surface abnormality information corresponding to a warning indicating that the abnormality has been detected in the road surface. For example, the output unit 180 may perform a process so as to display a warning message. Further, for example, the output unit 180 may perform a process so as to output a warning sound or voice. Further, for example, the output unit 180 may perform a process so as to make the terminal apparatus 40 emit warning light. Further, for example, the output unit 180 may perform a process so as to make the terminal apparatus 40 vibrate to indicate a warning.

Further, the output unit 180 may perform a process so as to output road surface abnormality information indicating an abnormal part of the road surface. In this case, the output unit 180 may perform a process so as to output road surface abnormality information which is an image in which a part detected as being abnormal in road surface observation data is highlighted. For example, the output unit 180 may perform a process so as to output an image in which a part detected as being abnormal in road surface observation data is surrounded by a rectangle. Further, the output unit 180 may perform a process so as to output road surface abnormality information which is an image in which a symbol indicating a place where the abnormality has been detected is displayed on a map on which the road surface is shown. That is, the output unit 180 may perform a process so as to display a symbol indicating a place on the road surface where the abnormality has been detected is displayed on a map on which the road surface is shown.

Further, when road surface abnormality information indicating the type of a detected abnormality is generated, the output unit 180 may perform a process so as to output the type of the detected abnormality. For example, the output unit 180 may perform a process so as to display the type of the abnormality at or near the place where the abnormality is detected in the road surface observation data. Further, for example, the output unit 180 may perform a process so as to display, near the symbol indicating the place where the abnormality has been detected on the map on which the road surface is shown, the type of the abnormality detected at the place. In this way, the user can easily recognize the type of the abnormality.

Figure 8:
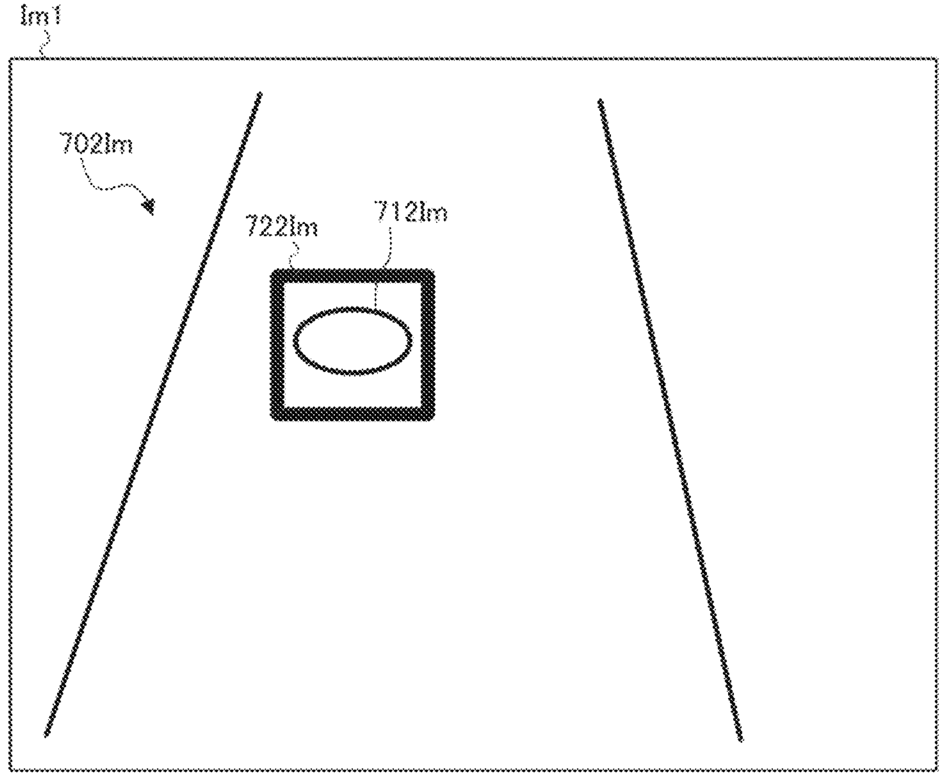
FIG. 8 shows an example of road surface abnormality information output by the road surface abnormality detection apparatus according to the present disclosure.
Figure 9:
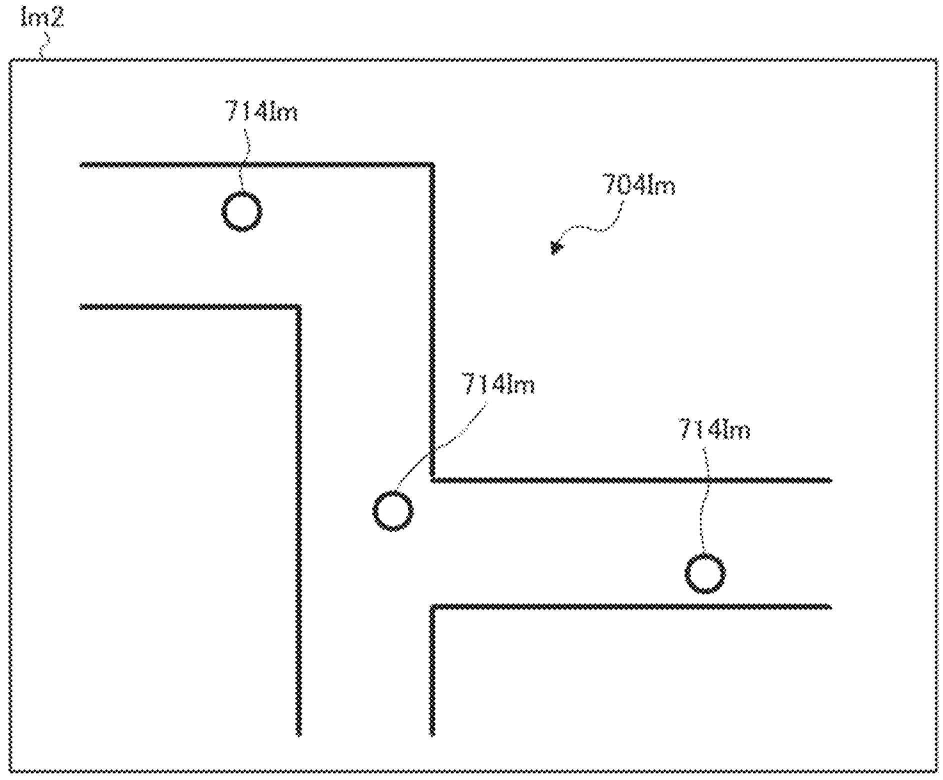
FIG. 9 shows an example of road surface abnormality information output by the road surface abnormality detection apparatus according to the present disclosure.

Each of FIGS. 8 and 9 shows an example of road surface abnormality information output by the road surface abnormality detection apparatus 100 according to the present disclosure. FIG. 8 shows an example of road surface abnormality information which is an image in which a part detected as being abnormal in road surface observation data is highlighted. FIG. 8 shows an image Im1 in which a road surface 702Im is shown. Then, an abnormal part 712Im such as a depression is present in the road surface 702Im. Then, in the example shown in FIG. 8, a highlighted display 722Im surrounding the abnormal part 712Im is drawn in a superimposed manner. In this way, the user can easily recognize that the abnormal part is present in the road surface.

FIG. 9 shows an example of road surface abnormality information which is an image in which symbols indicating places in each of which an abnormality has been detected are displayed on a map on which the road surface is shown. FIG. 9 shows an image Im2 in which a map 704Im in which the road surface is shown is shown. Further, symbols 714Im each of which indicates a place where an abnormality has been detected are drawn on the map 704Im in a superimposed manner. In this way, the user can easily recognize in which parts on the road surface abnormalities are present.

Figure 10:
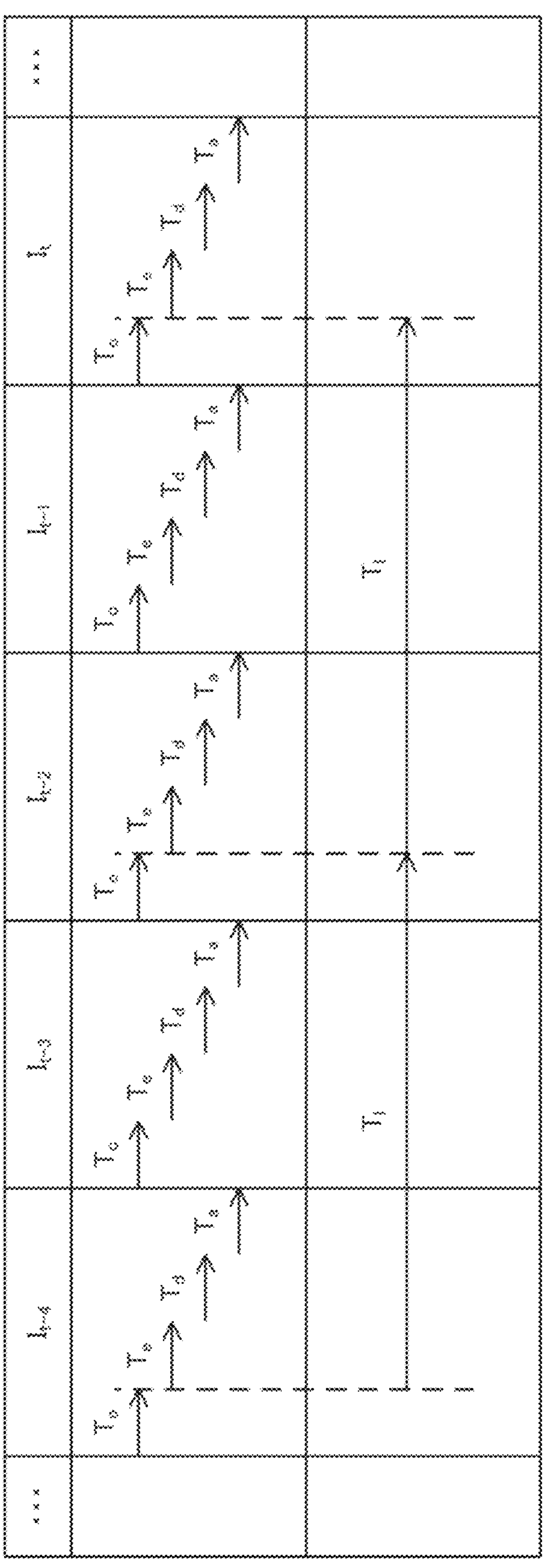
FIG. 10 is a diagram for explaining a case where a learning process according to the present disclosure is performed at an operation stage.
Figure 11:
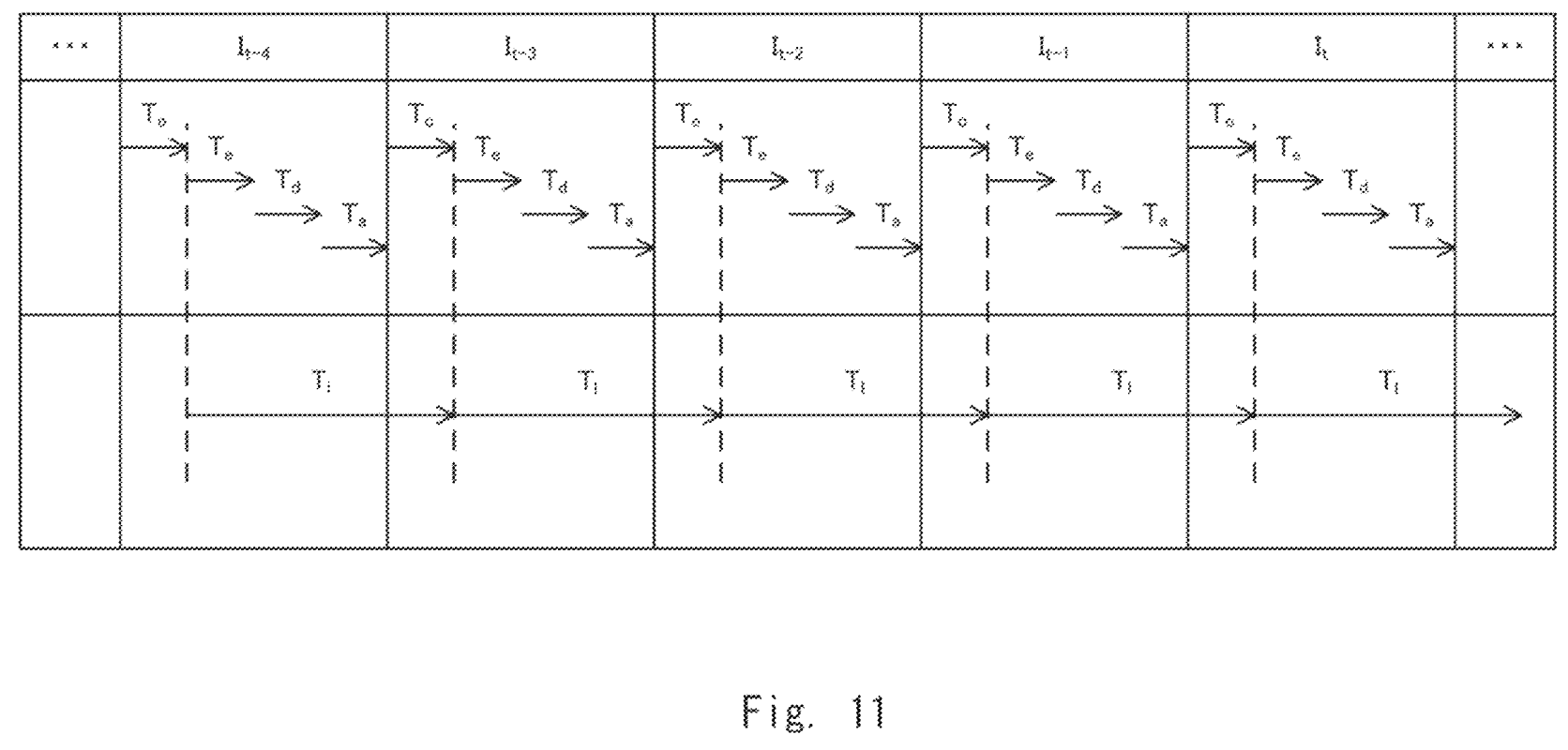
Figure 12:
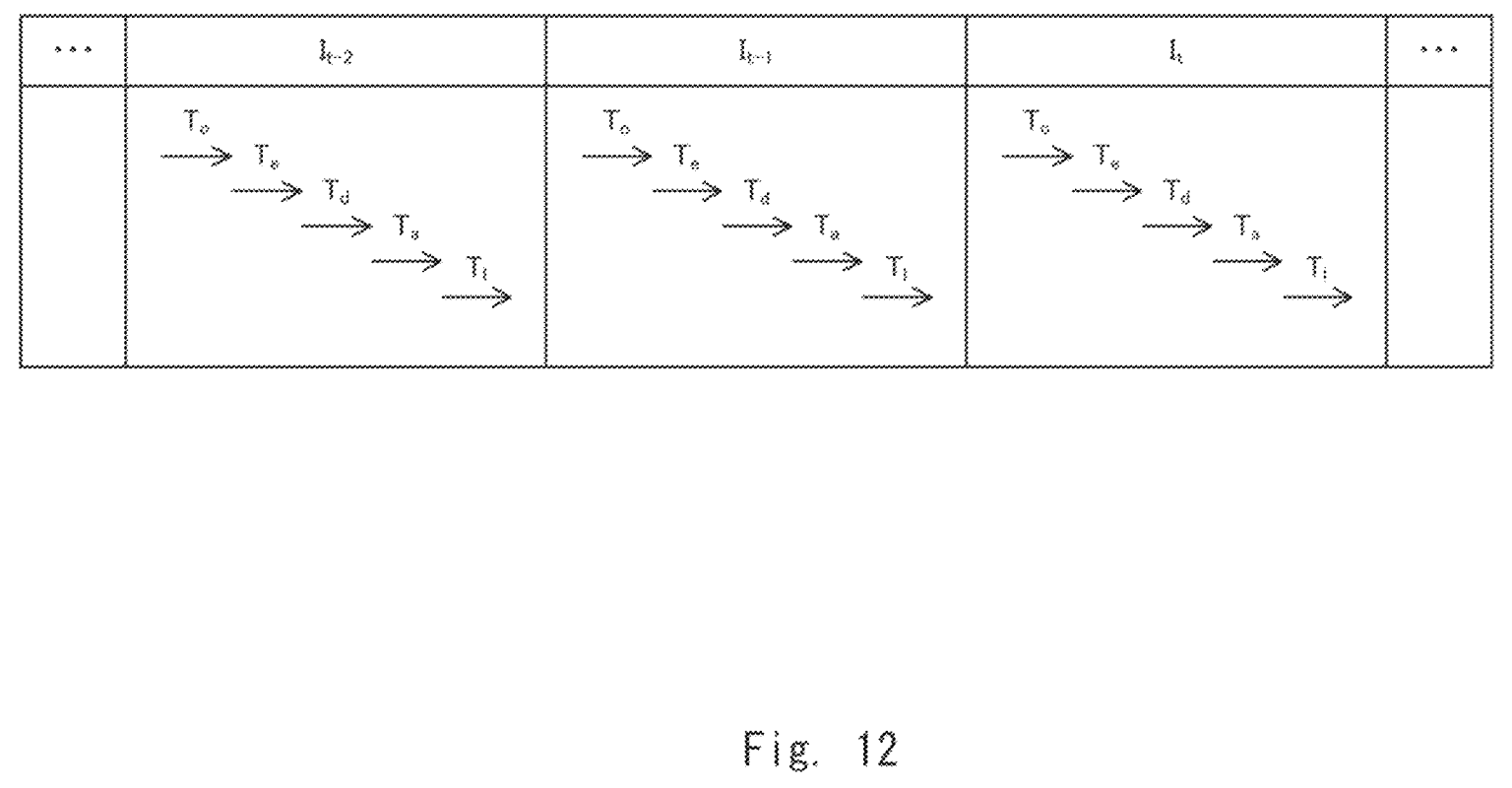

Each of FIGS. 10 to 12 is a diagram for explaining a case where a learning process according to the present disclosure is performed at an operation stage. FIG. 10 is a diagram for explaining a case where a learning process time is longer than a frame process time. Note that the "learning process time" is a time required for a learning process for road surface observation data composed of one frame data. That is, the learning process time is a time required for performing a learning process by using road surface observation data composed of one frame data and thereby updating weights. Further, the "frame process time" may be a time from the acquisition of a given frame data to the acquisition of the next frame data. The frame process time includes a time required for a frame process for one frame data (road surface observation data). Further, the frame process may be a series of processes that are performed from when frame data is acquired to when an abnormality detection process is performed for the frame data.

In each of FIGS. 10 to 12, $I_k$ represents a frame process for frame data acquired at a time #k. Note that the frame process includes a storage process, a prediction process, a difference calculation process, and an abnormality detection process (all of which will be described later). Note that the frame process time is represented by $T_I$. Further, the learning process time is represented by $T_1$.

Further, $T_o$ represents a storage process time. The storage process time is a time required for a storage process, which is a process from when given frame data, which is road surface observation data, is acquired to when the frame data is stored in the data storage unit 122. Further, $T_e$ represents a prediction process time. The prediction process time is a time required for a prediction process performed by the prediction unit 140. That is, the prediction process time is a time required to generate road surface prediction data at a time #k. Further, $T_d$ represents a difference calculation process time. The difference calculation process time is a time required for a difference calculation process performed by the difference calculation unit 150. That is, the difference calculation process time is a time required to calculate a difference between road surface prediction data at a time #k and road surface observation data at the time #k. Further, $T_a$ represents an abnormality detection process time. The abnormality detection process time is a time required for an abnormality detection process for road surface observation data at a time #k performed by the abnormality detection unit 160. Note that each of $T_e$, $T_d$ and $T_a$ is, for example, 1/30 sec or shorter, but they are not limited this example.

Note that in the frame process, the storage process, the prediction process, the difference calculation process, and the abnormality detection process are performed in a successive manner. Therefore, a relation $T_I \geq T_o + T_e + T_d + T_a$ holds. Further, in the example shown in FIG. 10, since the learning process time is longer than the frame process time, a relation $T_I < T_1$ holds. In this case, as shown in FIG. 10, the learning process is performed in parallel with the frame processing. In this case, while the learning process (hereinafter also referred to as the current learning process) for given frame data is being performed, the prediction process is performed in the frame process by using weights that have been updated in the learning process performed before the current learning process.

In the example shown in FIG. 10, a frame process $I_{t-4}$, a frame process $I_{t-3}$, a frame process $I_{t-2}$, a frame process $I_{t-1}$, and a frame process $I_t$ are successively performed. In the frame process $I_{t-4}$, frame data is acquired at a time #t-4. Then, in the frame process time $T_I$ of the frame process $I_{t-4}$, a storage process, a prediction process, a difference calculation process, and an abnormality detection process are performed in a successive manner. Meanwhile, when frame data is acquired at a time #t-4 and the acquired frame data is stored in the data storage unit 122, a learning process for the frame data acquired at the time #t-4 starts in parallel with the frame process $I_{t-4}$.

Note that the learning process for the frame data acquired at the time #t-4 does not end before the frame process time $T_I$ of the frame process $I_{t-4}$ ends. Therefore, the frame process $I_{t-3}$ next to the frame process $I_{t-4}$ starts before the learning process for the frame data acquired at the time #t-4 ends. That is, before the learning process for the frame data acquired at the time #t-4 ends, frame data is acquired at the time #t-3 and the acquired frame data is stored in the data storage unit 122. Therefore, in the frame process $I_{t-3}$, the frame process (prediction process) is performed by using the weights used in the frame process $I_{t-4}$. Further, when the frame process $I_{t-3}$ ends, the next frame process $I_{t-2}$ starts. That is, frame data is acquired at a time #t-2, and the acquired frame data is stored in the data storage unit 122.

In contrast, the learning process for the frame data acquired at the time #t-4 ends before the storage process ends in the frame process $I_{t-2}$. Therefore, in the frame process $I_{t-2}$, the frame process (prediction process) is performed by using the weights updated by the learning process for the frame data acquired at the time #t-4. Further, when frame data is acquired at a time #t-2 and the acquired frame data is stored in the data storage unit 122, the learning process for the frame data acquired at the time #t-2 starts in parallel with the frame process $I_{t-2}$.

Note that the learning process for the frame data acquired at the time #t-2 does not end before the frame process time $T_I$ of the frame process $I_{t-2}$ ends. Therefore, the frame process $I_{t-1}$ next to the frame process $I_{t-2}$ starts before the learning process for the frame data acquired at the time #t-2 ends. That is, before the learning process for the frame data acquired at the time #t-2 ends, frame data is acquired at a time #t-1 and the acquired frame data is stored in the data storage unit 122. Therefore, in the frame process $I_{t-1}$, the frame process (prediction process) is performed by using the weights used in the frame process $I_{t-2}$. Further, when the frame process $I_{t-1}$ ends, the next frame process $I_t$ starts. That is, frame data is acquired at a time #t, and the acquired frame data is stored in the data storage unit 122.

In contrast, the learning process for the frame data acquired at the time #t-2 ends before the storage process ends in the frame process $I_t$. Therefore, in the frame process $I_t$, the frame process (prediction process) is performed by using the weights updated by the learning process for the frame data acquired at the time #t-2. Further, when frame data is acquired at a time #t and the acquired frame data is stored in the data storage unit 122, the learning process for the frame data acquired at the time #t starts in parallel with the frame process $I_t$. After that, the frame processing and the learning process are performed in parallel in a similar manner.

FIG. 11 is a diagram for explaining a case where the learning process time is shorter than the frame process time. In the example shown in FIG. 11, since the learning process time is shorter than the frame process time, a relation $T_I > T_1$ holds. Meanwhile, in the example shown in FIG. 11, when the learning process is performed in a state in which the learning process is included in the frame process, the time required for the frame process exceeds the frame process time. That is, a relation $T_I < T_o + T_e + T_d + T_a + T_1$ holds. In this case, as shown in FIG. 11, the learning process is performed in parallel with the frame process. In this case, while the learning process (hereinafter also referred to as the current learning process) for given frame data is being performed, the prediction process is performed in the frame process by using weights that have been updated in the learning process performed before the current learning process.

In the example shown in FIG. 11, a frame process $I_{t-4}$, a frame process $I_{t-3}$, a frame process $I_{t-2}$, a frame process $I_{t-1}$, and a frame process $I_t$ are successively performed. In the frame process $I_{t-4}$, frame data is acquired at a time #t-4. Then, in the frame process time $T_I$ of the frame process $I_{t-4}$, a storage process, a prediction process, a difference calculation process, and an abnormality detection process are performed in a successive manner. Meanwhile, when frame data is acquired at a time #t-4 and the acquired frame data is stored in the data storage unit 122, a learning process for the frame data acquired at the time #t-4 starts in parallel with the frame process $I_{t-4}$.

Then, when the frame process $I_{t-4}$ ends, the next frame process $I_{t-3}$ starts. That is, frame data is acquired at a time #t-3, and the acquired frame data is stored in the data storage unit 122. Note that the learning process for the frame data acquired at the time #t-4 ends before the storage process ends in the frame process $I_{t-3}$ ends. Therefore, in the frame process $I_{t-3}$, the frame process (prediction process) is performed by using the weights updated by the learning process for the frame data acquired at the time #t-4. Further, when frame data is acquired at a time #t-3 and the acquired frame data is stored in the data storage unit 122, the learning process for the frame data acquired at the time #t-3 starts in parallel with the frame process $I_{t-3}$.

Then, when the frame process $I_{t-3}$ ends, the next frame process $I_{t-2}$ starts. That is, frame data is acquired at a time #t-2, and the acquired frame data is stored in the data storage unit 122. Note that the learning process for the frame data acquired at the time #t-3 ends before the storage process ends in the frame process $I_{t-2}$. Therefore, in the frame process $I_{t-2}$, the frame process (prediction process) is performed by using the weights updated by the learning process for the frame data acquired at the time #t-3. Further, when frame data is acquired at a time #t-2 and the acquired frame data is stored in the data storage unit 122, the learning process starts in parallel with the frame process $I_{t-2}$. After that, the frame processing and the learning process are performed in parallel in a similar manner.

FIG. 12 is a diagram for explaining a case where the learning process time is shorter than the frame process time, and the learning process and the frame process can be performed in a successive manner. In the example shown in FIG. 12, since the learning process time is shorter than the frame process time, a relation $T_I > T_1$ holds. Further, in the example shown in FIG. 12, even when the learning process is performed in a state in which the learning process is included in the frame process, the time required for the frame process does not exceed the frame process time. That is, a relation $T_I \geq T_o + T_e + T_d + T_a + T_1$ holds. In this case, as shown in FIG. 12, the learning process and the frame process are performed in a successive manner. In this case, while the learning process (hereinafter also referred to as the current learning process) for given frame data is being performed, the prediction process is performed in the frame process by using weights that have been updated in the learning process performed before the current learning process.

In the example shown in FIG. 12, a frame process $I_{t-2}$, a frame process $I_{t-1}$, and a frame process $I_t$ are successive performed. In the frame process $I_{t-2}$, frame data is acquired at a time #t-2. Further, in the frame process time $T_I$ of the frame process $I_{t-2}$, a storage process, a prediction process, a difference calculation process, an abnormality detection process, and a learning process are performed in a successive manner. That is, the frame process for the frame data acquired at the time #t-2 and the learning process for the frame data acquired at the time #t-2 are performed in a successive manner. Note that the learning process performed in the above-described processes may be performed by using road surface observation data for which no abnormality has been detected in the abnormality detection process of the frame process $I_{t-2}$.

Then, when the frame process $I_{t-2}$ ends, the next frame process $I_{t-1}$ starts. That is, in the frame process $I_{t-1}$, frame data is acquired at a time #t-1. Then, in the frame process time $T_I$ of the frame process $I_{t-1}$, a storage process, a prediction process, a difference calculation process, an abnormality detection process, and a learning process are performed in a successive manner. That is, the frame process for the frame data acquired at the time #t-1 and the learning process for the frame data acquired at the time #t-1 are performed in a successive manner. Note that the learning process performed in the above-described processes may be performed by using road surface observation data for which no abnormality has been detected in the abnormality detection process of the frame process $I_{t-1}$.

Then, when the frame process $I_t$ ends, the next frame process $I_t$ starts. That is, in the frame process $I_t$, frame data is acquired at a time #t. Then, in the frame process time $T_I$ of the frame process $I_t$, a storage process, a prediction process, a difference calculation process, an abnormality detection process, and a learning process are performed in a successive manner. That is, the frame process for the frame acquired at the time #t and the learning process for the frame data acquired at the time #t are performed in a successive manner. Note that the learning process performed in the above-described processes may be performed by using road surface observation data for which no abnormality has been detected in the abnormality detection process of the frame process $I_t$.

As shown in FIGS. 10 to 12, the road surface abnormality detection apparatus 100 according to the present disclosure may be configured so that the frame process and the learning process are performed every time frame data (road surface observation data) is acquired. By the above-described configuration, the road surface abnormality detection apparatus 100 according to the present disclosure can perform, while performing an online learning process, an abnormality detection process in real time while applying the latest weights to the acquired frame data (road surface observation data). In this way, in the case where a user moves along the road surface with the observation apparatus 30, the road surface abnormality detection apparatus 100 can immediately provide, to the user, information indicating whether or not an abnormality has been detected in the road surface observed by the observation apparatus 30. Therefore, it is possible to improve the usability for the user.

Further, as described above, in the road surface abnormality detection apparatus 100 according to the present disclosure, the learning unit 130 may perform machine learning and thereby update the weights of the trained model every time road surface observation data is acquired. Then, the prediction unit 140 may predict road surface data by using the updated weights. By the above-described configuration, the weights are repeatedly updated so that they conform to the conditions of the road surface at the timing when the road surface is observed by the observation apparatus 30. Therefore, it is possible to conform the trained model to the conditions of the road surface observed by the observation apparatus 30. In this way, it is possible to perform the prediction process by using the trained model which has been conformed to the conditions of the road surface observed by the observation apparatus 30. Therefore, it is possible to perform the abnormality detection process more appropriately.

Further, as described above, in the road surface abnormality detection apparatus 100 according to the present disclosure, the learning unit 130 may perform machine learning by using road surface observation data of which the difference from the predicted road surface data is smaller than a threshold, and thereby update the weights of the trained model. By the above-described configuration, it is possible to improve the accuracy of the prediction by the trained model for the road surface observed by the observation apparatus 30. Therefore, it is possible to perform the abnormality detection process more appropriately.

Further, in the road surface abnormality detection apparatus 100 according to the present disclosure, the data acquisition unit 120 may acquire road surface observation data by using an observation apparatus 30 that moves along the road surface. By the above-described configuration, it is possible to acquire road surface observation data that changes from moment to moment along the road surface. Note that the fact that the observation apparatus 30, or the entity or the like moving along the road surface with the observation apparatus 30 has successfully moved along the road surface may mean that there is a high possibility that there is no abnormality of the road surface. Therefore, road surface observation data that is acquired by observing the road surface on which the entity or the like has successfully moved along may be regarded as data corresponding to the normal road surface having no abnormality. Therefore, by performing the learning process by using such road surface observation data, the possibility that the predicted road surface data indicates a normal road surface having no abnormality increases. Therefore, it is possible to generate road surface prediction data indicating a normal road surface more appropriately without defining abnormal road surfaces and normal road surfaces by labels. Further, it is possible to determine that road surface observation data of which the difference from the above-described road surface prediction data is large is abnormal. Therefore, it is possible to perform the abnormality detection process more appropriately.

Here, assume that in the case where a user moves along a road surface with the observation apparatus 30, when the user is moving along a flat road surface, a level difference, an obstacle, or the like that could interfere with the passage of the user suddenly appears. In this case, the road surface abnormality detection apparatus 100 acquires road surface observation data in which an obstacle or the like that could interfere with the passage of the user is observed. Then, the road surface abnormality detection apparatus 100 determines that the difference between the acquired road surface observation data and the road surface data which has been predicted by using road surface observation data observed before the appearance of the obstacle or the like that could interfere with the passage of the user is equal to or larger than a threshold. Therefore, the road surface abnormality detection apparatus 100 can detect the presence of the obstacle or the like that could interfere with the passage of the user, i.e., can detect an abnormality of the road surface. Further, in such a case, the road surface abnormality detection apparatus 100 shows road surface abnormality information indicating a warning to the user. Therefore, it is possible to prevent the user from stumbling over the obstacle or the like that could interfere with the passage of the user.

Figure 13:
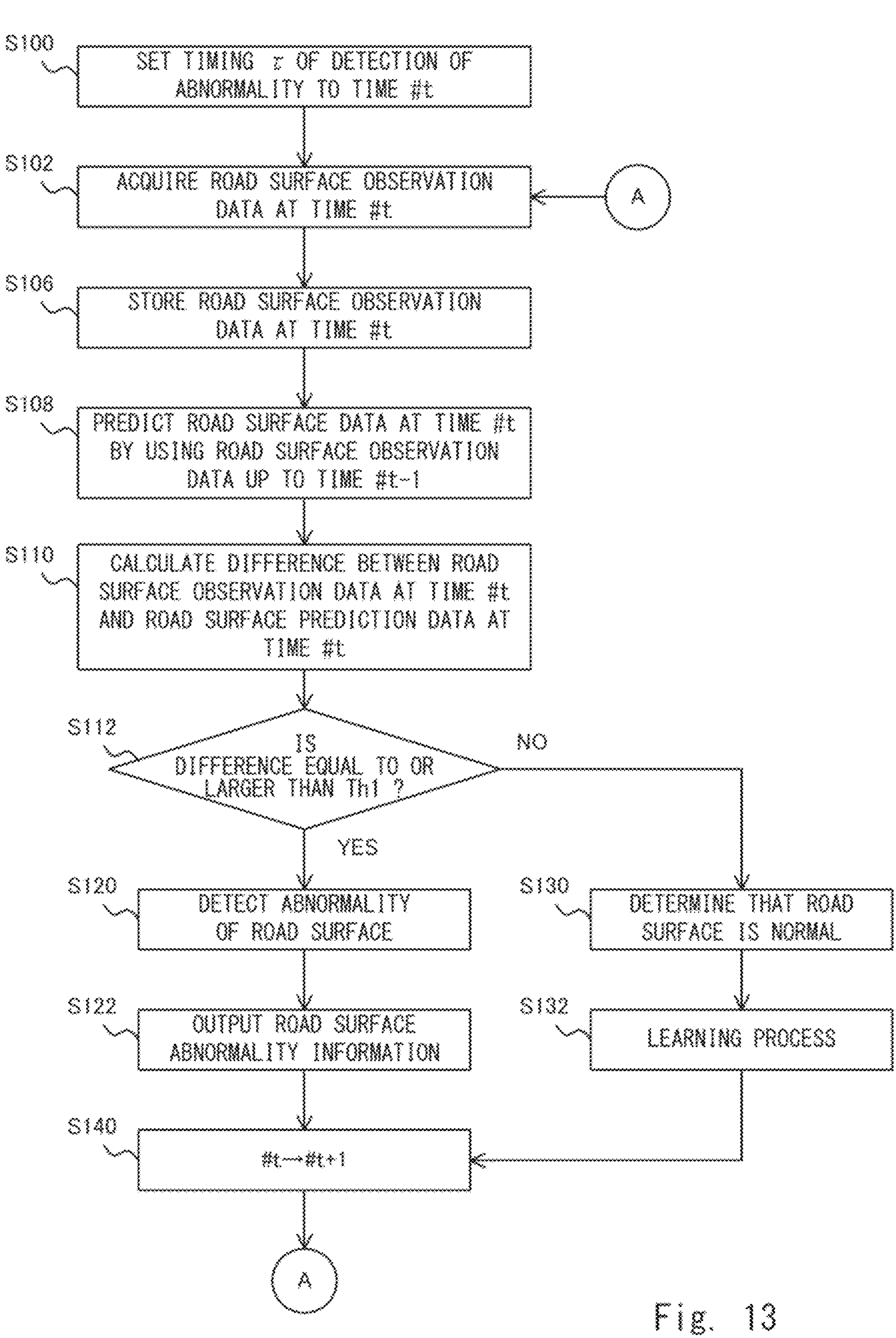
FIG. 13 is a flowchart showing an example of processes performed by the road surface abnormality detection apparatus according to the present disclosure.

FIG. 13 is a flowchart showing an example of processes performed by the road surface abnormality detection apparatus 100 according to the present disclosure. Note that FIG. 13 shows a method for detecting an abnormality of a road surface performed by the road surface abnormality detection apparatus 100 according to the present disclosure. Meanwhile, in the case where each of the components shown in FIG. 5 is implemented by cloud computing or a plurality of computers, the method shown in FIG. 13 is carried out by a road surface abnormality detection apparatus 100 that is implemented by cloud computing or a plurality of computers. Note that the processes shown in FIG. 13 is merely an example. The same applies to other flowcharts.

The road surface abnormality detection apparatus 100 sets a timing t for detecting an abnormality to a time #t (Step S100). Then, the road surface abnormality detection apparatus 100 acquires road surface observation data at the time #t (Step S102). Further, the road surface abnormality detection apparatus 100 stores the road surface observation data at the time #t (Step S106). Specifically, the data acquisition unit 120 acquires road surface observation data composed of one frame data at the time #t as described above. Further, the data storage unit 122 stores the road surface observation data composed of one frame data at the time #t as described above. Note that as described later, as the time #t is updated, i.e., as the time elapses, road surface observation data composed of a plurality of frame data in a chronological order are repeatedly stored in the data storage unit 122.

The road surface abnormality detection apparatus 100 predicts road surface data at the time #t by using a plurality of road surface observation data obtained up to the time #t-1 (Step S108). Specifically, as described above, the prediction unit 140 generates road surface prediction data at the time #t by inputting road surface observation data composed of a plurality of frame data obtained up to the time #t-1 into the trained model.

The road surface abnormality detection apparatus 100 calculates a difference between the road surface observation data at the time #t and the road surface prediction data at the time #t (Step S110). Specifically, as described above, the difference calculation unit 150 calculates a difference between the road surface observation data composed of the frame data at the time #t and the road surface prediction data composed of the frame data at the time #t by using, for example, a Loss function.

The road surface abnormality detection apparatus 100 determines whether or not the difference is equal to or larger than a threshold Th1 (Step S112). Specifically, as described above, the abnormality detection unit 160 determines whether the difference between the road surface observation data composed of the frame data at the time #t and the road surface prediction data composed of the frame data at the time #t, acquired by using, for example, a Loss function, is equal to or larger than the threshold Th1. Note that the threshold Th1 is a threshold set by the threshold setting unit 170.

When the difference is equal to or larger than the threshold Th1 (Yes in S112), the road surface abnormality detection apparatus 100 detects an abnormality of the road surface (Step S120). Specifically, the abnormality detection unit 160 detects an abnormality of the road surface in the road surface observation data at the time #t as described above. Then, the road surface abnormality detection apparatus 100 outputs road surface abnormality information (Step S122). Specifically, the abnormality information generation unit 162 generates road surface abnormality information indicating the abnormality of the road surface as described above. Then, the output unit 180 performs a process for outputting the road surface abnormality information as described above. Then, the process flow proceeds to a step S140.

On the other hand, when the difference is smaller than the threshold Th1 (No in S112), the road surface abnormality detection apparatus 100 determines that the road surface is normal (Step S130). Specifically, the abnormality detection unit 160 determines that the road surface is normal in the road surface observation data at the time #t as described above. Then, the road surface abnormality detection apparatus 100 performs a learning process (Step S132). Specifically, as described above, the learning unit 130 performs a learning process by using the road surface observation data in which the road surface has been determined to be normal at the time #t, and thereby updates the weights of the trained model. Then, the process flow proceeds to the step S140. Note that as described above, the learning unit 130 may perform the learning process in parallel with the above-described process by using all the acquired road surface observation data. Further, as described above, the learning unit 130 may perform the learning process and the above-described process in a successive manner by using all the acquired road surface observation data.

The road surface abnormality detection apparatus 100 updates the timing t for detecting an abnormality (Step S140). Specifically, the road surface abnormality detection apparatus 100 increments the timing t for detecting an abnormality by one, and increments the time #t to a time #t+1. Then, the process flow returns to the step S102, and the processes in the steps S102 to S140 are repeated. In this way, the abnormality detection process is performed for each of a plurality of road surface observation data acquired in a chronological order.

Third Example Embodiment

Next, a third example embodiment will be described with reference to the drawings. The following description and the drawings are partially omitted and simplified as appropriate for clarifying the explanation. Further, the same elements are denoted by the same reference numerals (or symbols) throughout the drawings, and redundant descriptions thereof are omitted as appropriate. Note that since a road surface abnormality detection system 20 according to the third example embodiment is substantially the same as that shown in FIG. 3, the description thereof will be partly omitted. Further, since the hardware configuration of the road surface abnormality detection apparatus according to the third example embodiment is substantially the same as that shown in FIG. 4, the description thereof will be partly omitted.

Figure 14:
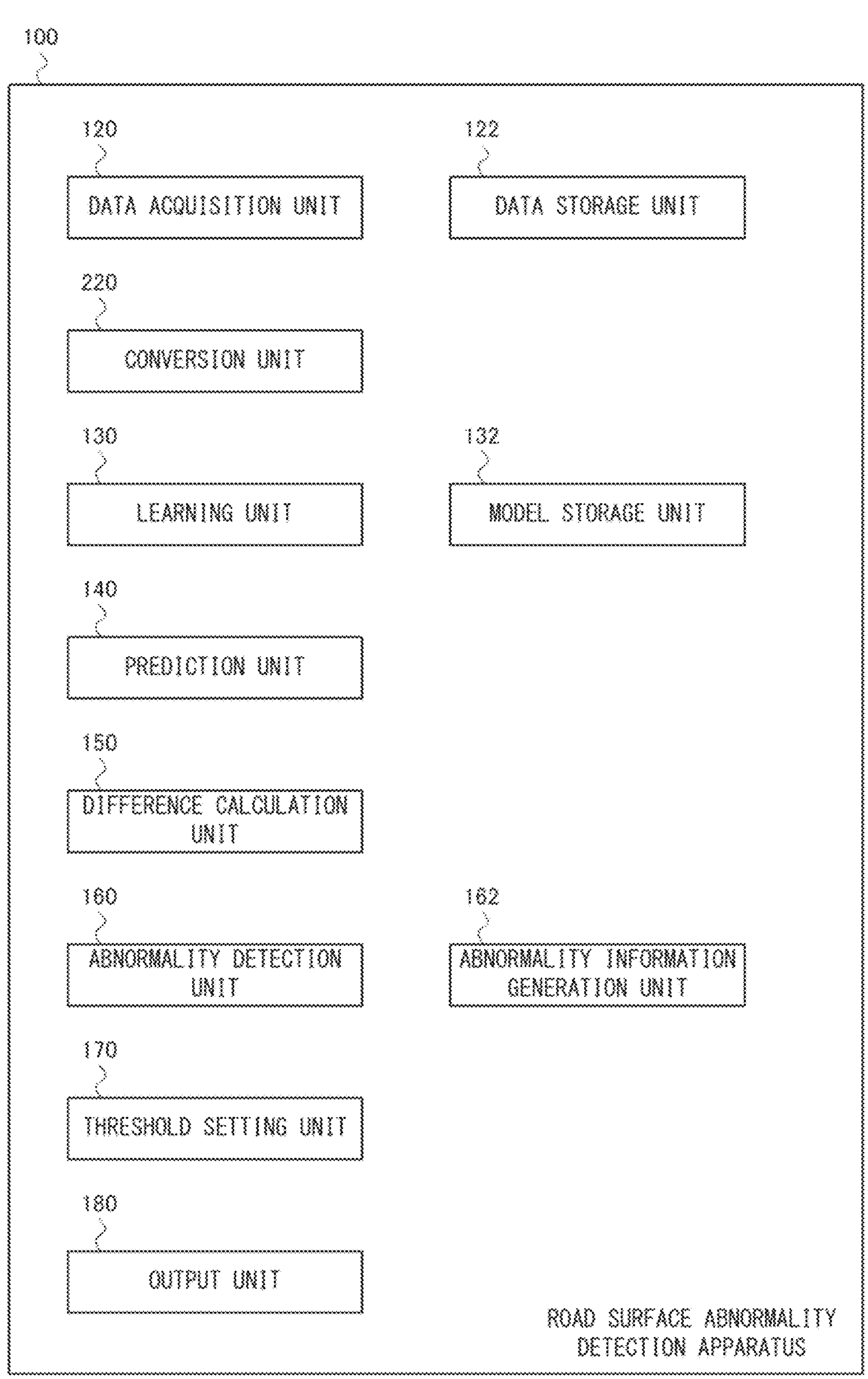
FIG. 14 shows an example of a functional configuration of the road surface abnormality detection apparatus according to the present disclosure.

FIG. 14 shows an example of a functional configuration of a road surface abnormality detection apparatus 100 according to the present disclosure. Similarly to the second example embodiment, the road surface abnormality detection apparatus 100 includes, as its components, a data acquisition unit 120, a data storage unit 122, a learning unit 130, and a model storage unit 132. Further, the road surface abnormality detection apparatus 100 also includes, as its components, a prediction unit 140, a difference calculation unit 150, an abnormality detection unit 160, an abnormality information generation unit 162, a threshold setting unit 170, and an output unit 180. Further, in the third example embodiment, the road surface abnormality detection apparatus 100 also includes a conversion unit 220. The conversion unit 220 functions as conversion means.

The conversion unit 220 converts a vector representing road surface observation data into one having a smaller number of dimensions (hereinafter also referred to as a low-dimensional vector). Specifically, the conversion unit 220 converts road surface observation data acquired by the data acquisition unit 120 into vector data having a smaller number of dimensions (hereinafter also referred to as a low-dimensional vector data). In other words, the conversion unit 220 converts road surface observation data into vector data having a smaller number of dimensions than the number of dimensions of the vector representing the road surface observation data. Still in other words, the conversion unit 220 generates low-dimensional vector data obtained by converting the vector representing the road surface observation data into a low-dimensional vector. Note that the low-dimensional vector data can be considered to be road surface observation data of which the number of dimensions is reduced. Therefore, the conversion unit 220 converts road surface observation data into one that is vector data having a smaller number of dimensions than that of the vector representing the road surface observation data.

The conversion unit 220 may be implemented by, for example, a VAE (Variational Autoencoder) that has been trained in advance. Specifically, the conversion unit 220 may be implemented by an encoder of a VAE composed of the encoder and a decoder. In this case, the conversion unit 220 may acquire low-dimensional vector data that is, as road surface observation data is input to the encoder of the VAE, output from the VAE. That is, the conversion unit 220 may generate low-dimensional vector data which is obtained by compressing (i.e., reduce) the number of dimensions of the original road surface observation data by using the VAE, and in which the original road surface observation data is expressed in an abstracted manner. The conversion unit 220 calculates a normal distribution of input data by using the VAE, stochastically samples components (feature values) from the calculated normal distribution, and thereby extracts components (feature values) of low-dimensional vector data. Note that the VAE may be trained in advance by using an ordinary data set such as a public data set according to the type of the input data (road surface observation data). Alternatively, the VAE may be trained in advance by using a data set independently collected according to the type of the input data (road surface observation data). Alternatively, the VAE may be trained in advance in such a manner that as a data set is entered to the VAE as an input, a data set is output from the VAE. Alternatively, the conversion unit 220 may be implemented by an autoencoder other than the VAE. Further, the low-dimensional vector data may correspond to latent variables of which the number of dimensions of input data is reduced by the encoder.

The data storage unit 122 may store the low-dimensional vector data obtained by converting the road surface observation data by the conversion unit 220. In other words, the data storage unit 122 may store the converted low-dimensional road surface observation data converted by the conversion unit 220. In general, the amount of low-dimensional vector data is smaller than that of road surface observation data, so that resources can be reduced.

The learning unit 130 may generate a trained model by performing machine learning in such a manner that as low-dimensional vector data obtained by converting a plurality of road surface observation data at a plurality of respective timings is entered into the trained model as an input, low-dimensional vector data corresponding to the road surface prediction data is output from the trained model. That is, the learning unit 130 may generate a trained model by performing machine learning in such a manner that as the converted road surface observation data, which is a plurality of low-dimensional vector data at a plurality of respective timings, is entered into the trained model as an input, road surface prediction data, which is low-dimensional vector data, is output from the trained model. The learning unit 130 may perform machine learning in such a manner that as the road surface observation data, which is a plurality of low-dimensional vector data at a plurality of respective timings, is entered into the trained model as an input, road surface data corresponding to low-dimensional vector data at a timing next to (i.e., immediately after) the plurality of timings is output from the trained model. Note that the "next timing of a plurality of timings" refers to a timing next to the last timing of the plurality of timings. The learning unit 130 may perform machine learning in such a manner that as the converted road surface observation data corresponding to a plurality of road surface observation data at a plurality of respective timings is entered into the trained model as an input, low-dimensional road surface data at a timing next to the plurality of timings is output from the trained model. Note that the "low-dimensional road surface data" refers to road surface data having dimensions corresponding to those of low-dimensional vector data.

The prediction unit 140 may predict low-dimensional road surface data having the number of dimensions corresponding to that of low-dimensional vector data at a first timing from the converted road surface observation data corresponding to a plurality of road surface observation data at a plurality of respective timings earlier than the first timing. That is, the prediction unit 140 may predict road surface data having dimensions corresponding to those of the converted low-dimensional road surface observation data at the first timing from the converted low-dimensional road surface observation data at the plurality of respective timings earlier than the first timing. In other words, the prediction unit 140 may generate low-dimensional vector data corresponding to the road surface prediction data at the first timing from low-dimensional vector data corresponding to road surface observation data at the plurality of respective timings earlier than the first timing. Further, the "first timing" may correspond to, for example, the time #t in FIGS. 15 and 16 (which will be described later).

The difference calculation unit 150 and the abnormality detection unit 160 may perform an abnormality detection process by comparing the converted road surface observation data at the first timing with the predicted low-dimensional road surface data at the first timing. Specifically, the difference calculation unit 150 may calculate a difference between the converted road surface observation data at the first timing and the predicted low-dimensional road surface data at the first timing. That is, the difference calculation unit 150 may calculate a difference between the converted low-dimensional road surface observation data at the first timing and the predicted low-dimensional road surface data at the first timing. In other words, the difference calculation unit 150 may calculate a difference between low-dimensional vector data corresponding to the road surface observation data at the first timing and low-dimensional vector data corresponding to the road surface prediction data at the first timing.

In this case, the abnormality detection unit 160 may detect an abnormality of the road surface when the difference between the converted road surface observation data at the first timing and the predicted low-dimensional road surface data at the first timing is equal to or larger than a threshold. That is, the abnormality detection unit 160 may detect an abnormality of the road surface when the difference between the converted low-dimensional road surface observation data at the first timing and the predicted low-dimensional road surface data at the first timing is equal to or larger than a threshold. In other words, the abnormality detection unit 160 may detect an abnormality of the road surface when the difference between the low-dimensional vector data corresponding to the road surface observation data at the first timing and the low-dimensional vector data corresponding to the road surface prediction data at the first timing is equal to or larger than a threshold.

Alternatively, the difference calculation unit 150 and the abnormality detection unit 160 may perform an abnormality detection process by comparing the unconverted road surface observation data (i.e., the original road surface observation data) at the first timing with road surface prediction data that is reconstructed from the low-dimensional road surface prediction data at the first timing so as to have the number of dimensions equal to that of the unconverted road surface prediction data (i.e., the original road surface prediction data). Specifically, the conversion unit 220 may convert road surface prediction data which is low-dimensional vector data output from the prediction unit 140 into road surface prediction data having dimensions equal to that of the unconverted road surface prediction data by using, for example, the decoder of the VAE. The difference calculation unit 150 may calculate a difference between the road surface prediction data having the number of dimensions equal to that of the original vector data, reconstructed from the low-dimensional vector data and the unconverted road surface observation data at the first timing. Then, the abnormality detection unit 160 may detect an abnormality when the difference between the road surface prediction data having the number of dimensions equal to that of the original vector data, reconstructed from the low-dimensional vector data and the unconverted road surface observation data at the first timing is equal to or larger than a threshold.

Figure 15:
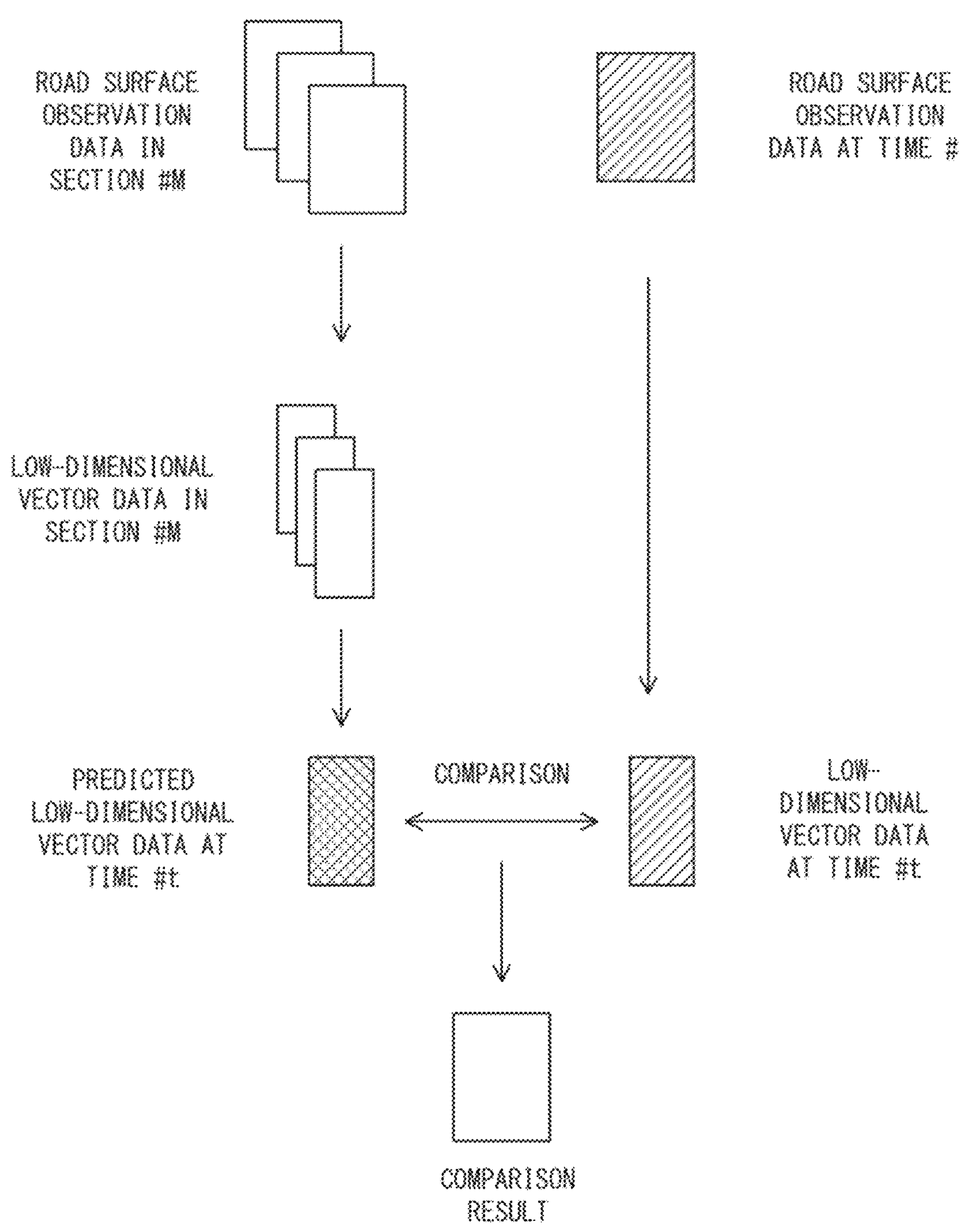
FIG. 15 is a diagram for explaining a process using low-dimensional vector data according to the present disclosure.
Figure 16:
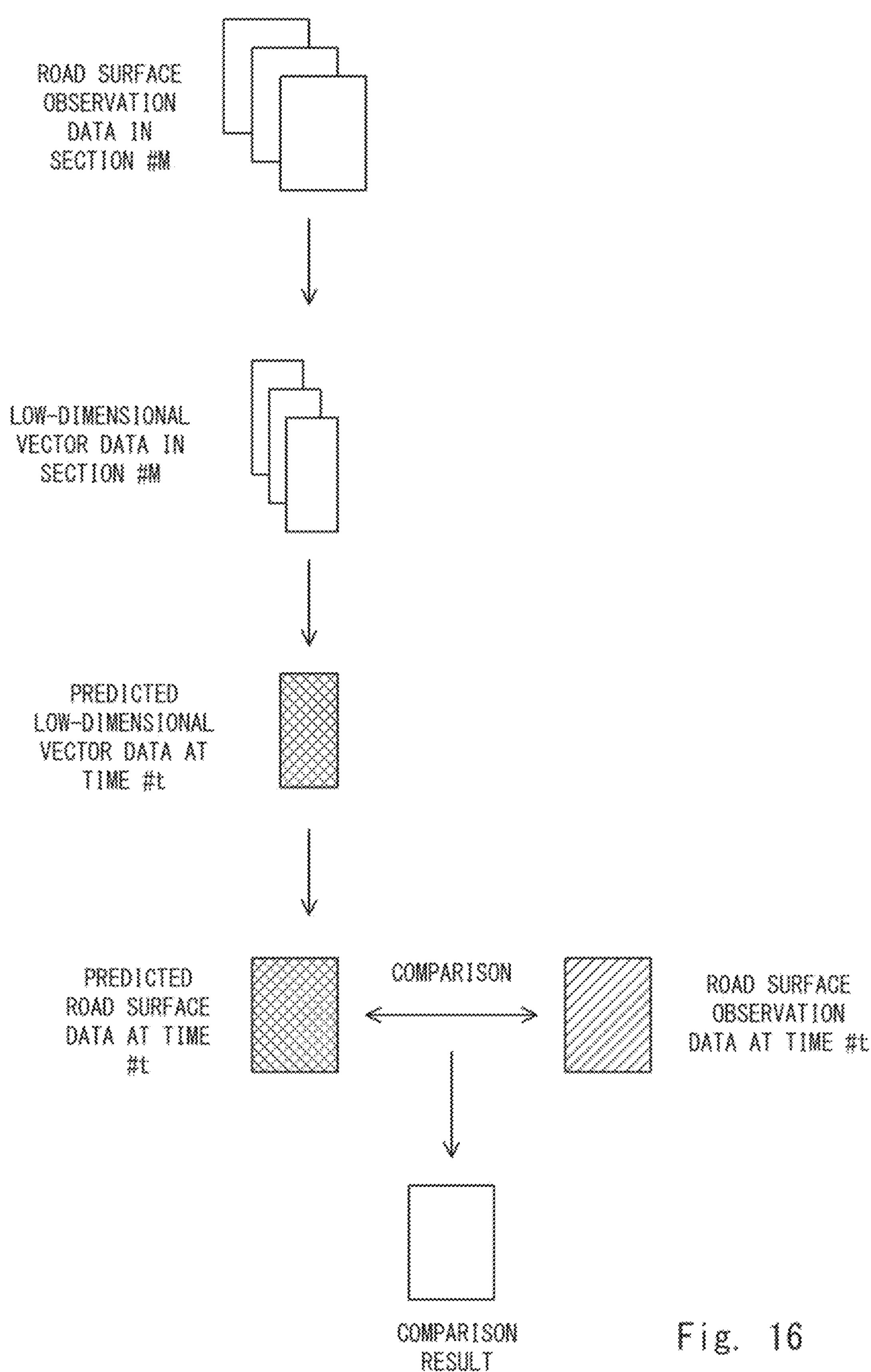
FIG. 16 is a diagram for explaining a process using low-dimensional vector data according to the present disclosure.

Each of FIGS. 15 and 16 is a diagram for explaining a process using low-dimensional vector data according to the present disclosure. Each of FIGS. 15 and 16 shows a case where a process for detecting an abnormality of a road surface at a time #t is performed. FIG. 15 is a diagram for explaining a case where the abnormality detection unit 160 compares road surface prediction data which is low-dimensional vector data with road surface observation data which is low-dimensional vector data. The conversion unit 220 converts road surface observation data in a section #M which is composed of a predetermined number N of road surface observation data before the time #t into road surface observation data which is low-dimensional vector data. That is, the conversion unit 220 converts the road surface observation data in the section #M and thereby acquires low-dimensional vector data in the section #M. Further, the conversion unit 220 converts road surface observation data at the time #t into road surface observation data which is low-dimensional vector data. That is, the conversion unit 220 converts the road surface observation data at the time #t and thereby acquires low-dimensional vector data at the time #t.

Further, the prediction unit 140 generates low-dimensional vector data corresponding to the road surface prediction data at the time #t by using the low-dimensional vector data in the section #M. That is, the prediction unit 140 generates predicted low-dimensional vector data at the time #t by using the low-dimensional vector data in the section #M. The difference calculation unit 150 compares the predicted low-dimensional vector data at the time #t with the low-dimensional vector data corresponding to the road surface observation data at the time #t, and thereby calculates the difference therebetween. The abnormality detection unit 160 generates a comparison result according to the difference. When the difference is equal to or larger than a threshold, the abnormality detection unit 160 generates a comparison result indicating that an abnormality of the road surface has been detected. On the other hand, when the difference is smaller than the threshold, the abnormality detection unit 160 generates a comparison result indicating that the road surface is normal.

FIG. 16 is a diagram for explaining a case where in the abnormality detection unit 160, low-dimensional vector data having the number of dimensions equal to that of the original vector data, reconstructed from the predicted low-dimensional vector data is compared with the unconverted road surface observation data. The conversion unit 220 converts road surface observation data in a given section #M which is composed of a predetermined number N of road surface observation data before the time #t into road surface observation data which is low-dimensional vector data by using, for example, the encoder of the VAE. That is, the conversion unit 220 converts the road surface observation data in the section #M and thereby acquires low-dimensional vector data in the section #M.

Further, the prediction unit 140 generates low-dimensional vector data corresponding to the road surface prediction data at the time #t by using the low-dimensional vector data in the section #M. That is, the prediction unit 140 generates predicted low-dimensional vector data at the time #t by using the low-dimensional vector data in the section #M. Then, the conversion unit 220 converts the low-dimensional vector data corresponding to the road surface prediction data at the time #t into reconstructed road surface prediction data having the number of dimensions equal to that of the original vector data by using, for example, the decoder of the VAE. That is, the conversion unit 220 reconstructs the predicted low-dimensional vector data at the time #t into road surface prediction data having the number of dimensions equal to that of the original vector data.

The difference calculation unit 150 compares the reconstructed road surface prediction data having the number of dimensions equal to that of the original vector data at the time #t with the road surface observation data at the time #t, and thereby calculates the difference therebetween. Then, the abnormality detection unit 160 generates a comparison result according to the calculated difference. When the difference is equal to or larger than a threshold, the abnormality detection unit 160 generates a comparison result indicating that an abnormality of the road surface has been detected. On the other hand, when the difference is smaller than the threshold, the abnormality detection unit 160 generates a comparison result indicating that the road surface is normal.

As described above, in the road surface abnormality detection apparatus 100 according to the present disclosure, the conversion unit 220 may convert road surface observation data into road surface observation data which is low-dimensional vector data having the number of dimensions smaller than that of the vector representing the road surface observation data. By the above-described configuration, even when road surface observation data which is the input data is data having a large number of dimensions (hereinafter also referred to as high-dimensional data) such as image data or normal vector map, the road surface abnormality detection apparatus 100 can process low-dimensional vector data.

Specifically, when high-dimensional data is used as input data in a machine learning algorithm such as an LSTM, the number of parameters of the trained model may increase. As a result, it may cause an adverse effect such as deterioration of the prediction accuracy or a difficulty in the convergence of the learning. For this matter, it is possible to reduce the number of parameters of the trained model by using low-dimensional vector data as input data in the machine learning algorithm. Therefore, the prediction accuracy can be improved. Further, it enables the learning to easily converge.

Further, as described above, since the conversion unit 220 extracts feature values sampled from the normal distribution of road surface observation data, it can extract feature values appropriately representing features of the road surface observation data. Therefore, it is possible to reduce the number of parameters of the trained model and enable the learning to easily converge. Further, even when the road surface observation data used at the learning stage and the road surface observation data input at the operation stage significantly differ from each other, feature values can be extracted from the input road surface observation data in a robust manner. In other words, the robustness in the machine learning can be enhanced. Therefore, the prediction accuracy can be improved.

Further, as shown in FIG. 15, it is possible to appropriately calculate the difference in the difference calculation unit 150 by performing the comparison between low-dimensional vector data. That is, in the case where the difference is calculated by a Loss function or the like, when the number of components of vector data to be compared is large, noises are likely to occur. In contrast, the converted low-dimensional vector data obtained by the conversion unit 220 is data which appropriately represents features of the unconverted road surface observation data (i.e., the original road surface observation data) and of which the number of dimensions is reduced. Therefore, even when the difference between low-dimensional vector data is calculated, the difference corresponding to the magnitude of the difference between the unconverted road surface observation data and the road surface prediction data of which the number of dimensions is not reduced can be calculated. Therefore, by calculating the difference between low-dimensional vector data, it is possible to appropriately calculate the difference while preventing noises from occurring.

Further, when it is desired to display an abnormal part of the road surface as a comparison result, the difference calculation unit 150 may calculate, as shown in FIG. 16, the difference between road surface prediction data having the number of dimensions equal to that of the original vector data, reconstructed from the predicted low-dimensional vector data and the unconverted road surface observation data (i.e., the original road surface observation data). In this way, similarly to the second example embodiment, as shown in FIG. 8, it is possible to generate road surface abnormality information in which an abnormal part is highlighted. Therefore, it is possible to visualize an abnormal part of the road surface while achieving stable learning and improving the prediction accuracy.

Figure 17:
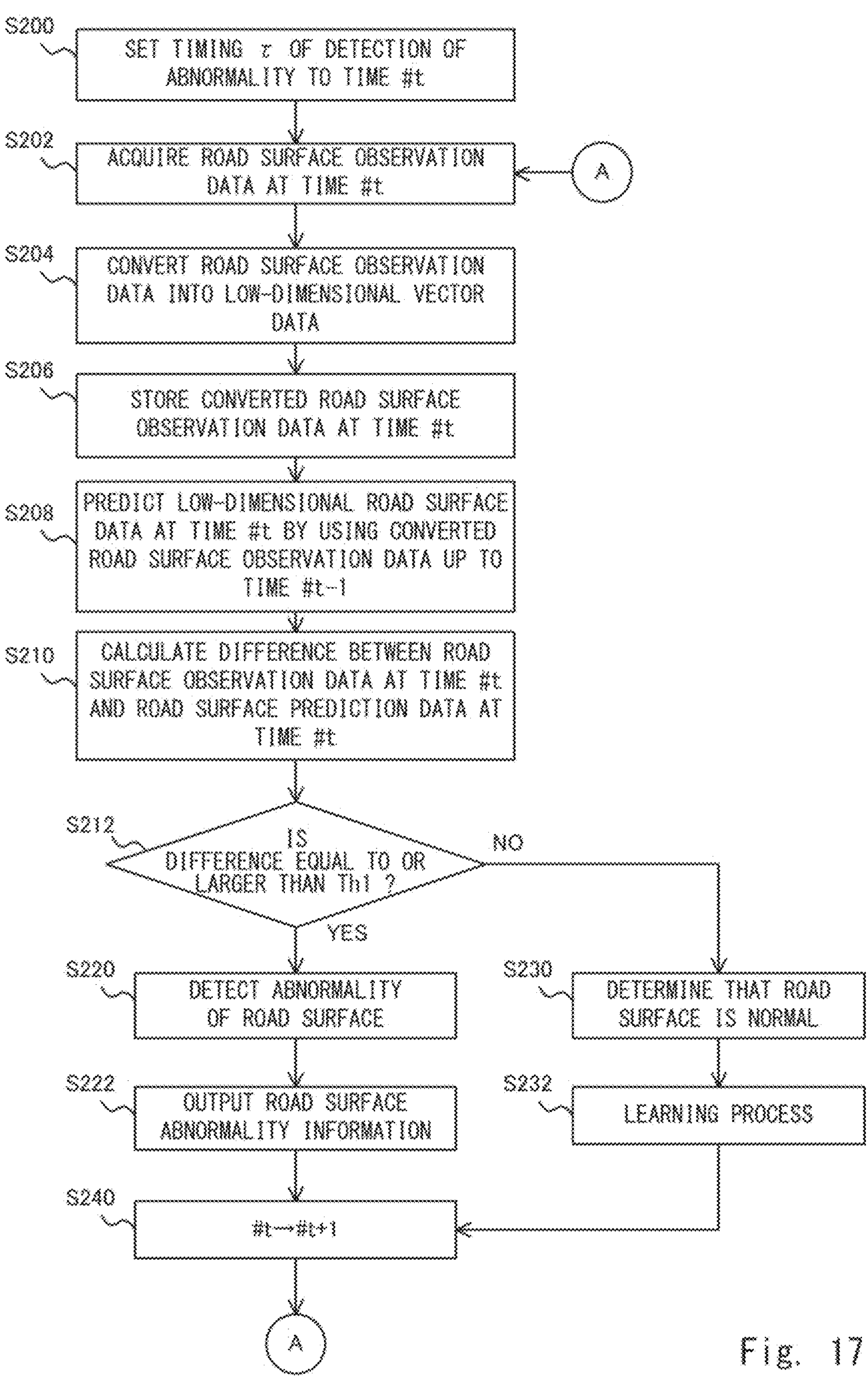
FIG. 17 is a flowchart showing an example of a process performed by the road surface abnormality detection apparatus according to the present disclosure.

FIG. 17 is a flowchart showing an example of processes performed by the road surface abnormality detection apparatus 100 according to the present disclosure. Note that FIG. 17 shows a method for detecting an abnormality of a road surface performed by the road surface abnormality detection apparatus 100 according to the present disclosure. Similarly to the step S100 in FIG. 13, the road surface abnormality detection apparatus 100 sets a timing t for detecting an abnormality to a time #t (Step S200). Then, similarly to the step S102 in FIG. 13, the road surface abnormality detection apparatus 100 acquires road surface observation data at the time #t (Step S202). Specifically, the data acquisition unit 120 acquires road surface observation data composed of one frame data at the time #t as described above.

As described above, the road surface abnormality detection apparatus 100 converts road surface observation data into low-dimensional vector data (Step S204). Specifically, the conversion unit 220 converts road surface observation data at the time #t into road surface observation data which is low-dimensional vector data having a reduced number of dimensions. Then, the road surface abnormality detection apparatus 100 stores the converted road surface observation data at the time #t (Step S206). That is, the data storage unit 122 stores the road surface observation data which is low-dimensional vector data at the time #t. Note that as described later, as the time #t is updated, i.e., as the time elapses, road surface observation data, which is composed of a plurality of frame data in a chronological order and is low-dimensional vector data, are repeatedly stored in the data storage unit 122.

The road surface abnormality detection apparatus 100 predicts low-dimensional road surface data at the time #t by using a plurality of converted road surface observation data obtained up to the time #t-1 (Step S208). Specifically, as described above, the prediction unit 140 generates low-dimensional vector data corresponding to the road surface prediction data at the time #t by inputting low-dimensional vector data acquired by converting a plurality of road surface observation data obtained up to the time #t-1 into the trained model.

The road surface abnormality detection apparatus 100 calculates a difference between the road surface observation data at the time #t and the road surface prediction data at the time #t (Step S210). Specifically, as described above with reference to FIG. 15, the difference calculation unit 150 may calculate the difference between low-dimensional vector data corresponding to the road surface prediction data at the time #t and low-dimensional vector data corresponding to the road surface observation data at the time #t. Alternatively, as described above with reference to FIG. 16, the difference calculation unit 150 may calculate the difference between road surface prediction data having the number of dimensions equal to that of the original vector data, reconstructed from the predicted low-dimensional vector data at the time #t and the unconverted road surface observation data at the time #t.

Similarly to the step S112 in FIG. 13, the road surface abnormality detection apparatus 100 determines whether or not the difference is equal to or larger than a threshold Th1 (Step S212). Specifically, as described above, the abnormality detection unit 160 may determine whether or not the difference between the low-dimensional vector data corresponding to the road surface prediction data at the time #t and the low-dimensional vector data corresponding to the road surface observation data at the time #t is equal to or larger than the threshold Th1. Alternatively, as described above, the abnormality detection unit 160 may determine whether or not the difference between road surface prediction data having the number of dimensions equal to that of the original vector data, reconstructed from the predicted low-dimensional vector data at the time #t and the unconverted road surface observation data at the time #t is equal to or larger than the threshold Th1. Note that the threshold Th1 used in the comparison of low-dimensional vector data may be different from the threshold Th1 used in the comparison of data having the number of dimensions equal to that of the original vector data.

When the difference is equal to or larger than the threshold Th1 (Yes in S212), the road surface abnormality detection apparatus 100 detects an abnormality of the road surface (Step S220) as in the step S120 in FIG. 13. That is, the abnormality detection unit 160 detects an abnormality of the road surface for the road surface observation data at the time #t. Then, similarly to S222 in FIG. 13, the road surface abnormality detection apparatus 100 outputs road surface abnormality information (Step S222). Then, the process flow proceeds to a step S240.

On the other hand, when the difference is smaller than the threshold Th1 (No in S212), the road surface abnormality detection apparatus 100 determines that the road surface is normal (Step S230) as in the step S130 in FIG. 13. That is, the abnormality detection unit 160 determines that the road surface is normal for the road surface observation data at the time #t. Then, similarly to the step S132 in FIG. 13, the road surface abnormality detection apparatus 100 performs a learning process (Step S232). Note that as described above, the learning unit 130 may perform the learning process in parallel with the above-described process by using all the acquired road surface observation data. Further, as described above, the learning unit 130 may perform the learning process and the above-described process in a successive manner by using all the acquired road surface observation data.

Similarly to the step S140 in FIG. 13, the road surface abnormality detection apparatus 100 updates the timing t for detecting an abnormality (Step S240). Then, the process flow returns to the step S202, and the processes in the steps S202 to S240 are repeated. In this way, the abnormality detection process is performed for road surface observation data acquired in a chronological order.

Modified Example

Although the present disclosure has been described above with reference to example embodiments, the present disclosure is not limited to the above-described example embodiments. Various modifications that can be understood by those skilled in the art can be made to the configuration and details of the present disclosure within the scope of the disclosure. Further, each of the example embodiments can be combined with any of other example embodiments as appropriate.

Each of the drawings is merely an example to illustrate one or more embodiments. Each of the drawing is not associated with only one specific embodiment, but may be associated with one or more other embodiments. As will be understood by those skilled in the art, various features or steps described with reference to any one of the drawings may be combined with features or steps shown in one or more other drawings in order to create, for example, an embodiment that is not explicitly shown in the drawings or described in the specification. Not all of the features or steps shown in any one of the drawings to describe an embodiment are necessarily indispensable, and some features or steps may be omitted. The order of steps in any of the drawings may be changed as appropriate.

The above-described program includes a set of instructions (or software codes) that, when read into a computer, causes the computer to perform one or more of the functions described in the example embodiments. The program may be stored in a non-transitory computer readable medium or in a physical storage medium. By way of example rather than limitation, a computer readable medium or a physical storage medium may include a random-access memory (RAM), a read-only memory (ROM), a flash memory, a solid-state drive (SSD), or other memory technology, a CD-ROM, a digital versatile disk (DVD), a Blu-ray (Registered Trademark) disc or other optical disc storages, a magnetic cassette, magnetic tape, and a magnetic disc storage or other magnetic storage devices. The program may be transmitted on a transitory computer readable medium or a communication medium. By way of example rather than limitation, the transitory computer readable medium or the communication medium may include electrical, optical, acoustic, or other forms of propagating signals.

The whole or part of the example embodiments disclosed above can be described as, but not limited to, the following supplementary notes.

(Supplementary Note 1)

A road surface abnormality detection apparatus comprising:

data acquisition means for acquiring road surface observation data obtained by observing a road surface in a chronological order;

prediction means for predicting road surface data at a first timing from a plurality of road surface observation data at a plurality of respective timings earlier than the first timing by using a trained model generated in advance through machine learning; and abnormality detection means for detecting, when a difference between road surface observation data at the first timing and the predicted road surface data at the first timing is equal to or larger than a predetermined threshold, an abnormality of the road surface.

(Supplementary Note 2)

The road surface abnormality detection apparatus described in Supplementary note 1, wherein the data acquisition means acquires the road surface observation data by using an observation apparatus configured to move along the road surface while observing the road surface.

(Supplementary Note 3)

The road surface abnormality detection apparatus described in Supplementary note 1, further comprising output means for performing, when an abnormality is detected in the road surface, a process for outputting information indicating that the abnormality has been detected in the road surface.

(Supplementary Note 4)

The road surface abnormality detection apparatus described in Supplementary note 3, wherein the output means performs a process for displaying a symbol indicating a place where the abnormality has been detected in the road surface on a map on which the road surface is shown.

(Supplementary Note 5)

The road surface abnormality detection apparatus described in Supplementary note 1, further comprising conversion means for converting the road surface observation data into road surface observation data composed of low-dimensional vector data having a smaller number of dimensions than that of a vector representing the road surface observation data, wherein the prediction means predicts low-dimensional road surface data having dimensions corresponding to those of the low-dimensional vector data at the first timing from the converted road surface observation data corresponding to the plurality of road surface observation data at the plurality of respective timings earlier than the first timing.

(Supplementary Note 6)

The road surface abnormality detection apparatus described in Supplementary note 5, wherein the abnormality detection means detects the abnormality of the road surface when a difference between the converted road surface observation data at the first timing and predicted low-dimensional road surface data at the first timing is equal to or larger than the threshold.

(Supplementary Note 7)

The road surface abnormality detection apparatus described in Supplementary note 1, further comprising learning means for generating a trained model by performing machine learning in such a manner that as a plurality of road surface observation data at a plurality of respective timings are entered into the trained model as inputs, road surface data at a timing next to a last timing of the plurality of timings is output from the trained model.

(Supplementary Note 8)

The road surface abnormality detection apparatus described in Supplementary note 7, wherein the learning means performs the machine learning by using the road surface observation data of which a difference from the predicted road surface data is smaller than the threshold, and thereby updates a weight of the trained model.

(Supplementary Note 9)

The road surface abnormality detection apparatus described in Supplementary note 7, wherein the learning means performs the machine learning and thereby updates the weight of the trained model every time the road surface observation data is acquired, and the prediction means predicts the road surface data by using the updated weight.

(Supplementary Note 10)

The road surface abnormality detection apparatus described in Supplementary note 1, wherein the abnormality detection means detects the abnormality of the road surface by using the threshold set according to an attribute of the road surface.

(Supplementary Note 11)

The road surface abnormality detection apparatus described in Supplementary note 3, wherein the output means performs a process for outputting a type of the detected abnormality.

(Supplementary Note 12)

A road surface abnormality detection method comprising:

acquiring road surface observation data obtained by observing a road surface in a chronological order;

predicting road surface data at a first timing from a plurality of road surface observation data at a plurality of respective timings earlier than the first timing by using a trained model generated in advance through machine learning; and detecting, when a difference between road surface observation data at the first timing and the predicted road surface data at the first timing is equal to or larger than a predetermined threshold, an abnormality of the road surface.

(Supplementary Note 13)

The road surface abnormality detection method described in Supplementary note 12, wherein the road surface observation data is acquired by an observation apparatus configured to move along the road surface while observing the road surface.

(Supplementary Note 14)

The road surface abnormality detection method described in Supplementary note 12, wherein when an abnormality is detected in the road surface, a process for outputting information indicating that the abnormality has been detected in the road surface is performed.

(Supplementary Note 15)

The road surface abnormality detection method described in Supplementary note 14, wherein a process for displaying a symbol indicating a place where the abnormality has been detected in the road surface on a map on which the road surface is shown is performed.

(Supplementary Note 16)

The road surface abnormality detection method described in Supplementary note 12, wherein the road surface observation data is converted into road surface observation data composed of low-dimensional vector data having a smaller number of dimensions than that of a vector representing the road surface observation data, and low-dimensional road surface data having dimensions corresponding to those of the low-dimensional vector data at the first timing is predicted from the converted road surface observation data corresponding to the plurality of road surface observation data at the plurality of respective timings earlier than the first timing.

(Supplementary Note 17)

The road surface abnormality detection method described in Supplementary note 16, wherein the abnormality of the road surface is detected when a difference between the converted road surface observation data at the first timing and predicted low-dimensional road surface data at the first timing is equal to or larger than the threshold.

(Supplementary Note 18)

The road surface abnormality detection method described in Supplementary note 12, a trained model is generated by performing machine learning in such a manner that as a plurality of road surface observation data at a plurality of respective timings are entered into the trained model as inputs, road surface data at a timing next to a last timing of the plurality of timings is output from the trained model.

(Supplementary Note 19)

The road surface abnormality detection method described in Supplementary note 18, wherein the machine learning is performed by using the road surface observation data of which a difference from the predicted road surface data is smaller than the threshold, and thereby a weight of the trained model is updated.

(Supplementary Note 20)

The road surface abnormality detection method described in Supplementary note 18, wherein the machine learning is performed and the weight of the trained model is thereby updated every time the road surface observation data is acquired, and the road surface data is predicted by using the updated weight.

(Supplementary Note 21)

The road surface abnormality detection method described in Supplementary note 12, wherein the abnormality of the road surface is detected by using the threshold set according to an attribute of the road surface.

(Supplementary Note 22)

The road surface abnormality detection method described in Supplementary note 14, wherein a process for outputting a type of the detected abnormality is performed.

(Supplementary Note 23)

A program for causing a computer to implement:

a function of acquiring road surface observation data obtained by observing a road surface in a chronological order;

a function of predicting road surface data at a first timing from a plurality of road surface observation data at a plurality of respective timings earlier than the first timing by using a trained model generated in advance through machine learning; and a function of detecting, when a difference between road surface observation data at the first timing and the predicted road surface data at the first timing is equal to or larger than a predetermined threshold, an abnormality of the road surface.

(Supplementary Note 24)

The program described in Supplementary note 23, for causing the computer to implement a function of acquiring the road surface observation data by using an observation apparatus configured to move along the road surface while observing the road surface.

(Supplementary Note 25)

The program described in Supplementary note 23, for causing the computer to implement a function of performing, when an abnormality is detected in the road surface, a process for outputting information indicating that the abnormality has been detected in the road surface.

(Supplementary Note 26)

The program described in Supplementary note 25, for causing the computer to implement a function of perform a process for displaying a symbol indicating a place where the abnormality has been detected in the road surface on a map on which the road surface is shown.

(Supplementary Note 27)

The program described in Supplementary note 23, for causing the computer to implement:

a function of converting the road surface observation data into road surface observation data composed of low-dimensional vector data having a smaller number of dimensions than that of a vector representing the road surface observation data, and a function of predicting low-dimensional road surface data having dimensions corresponding to those of the low-dimensional vector data at the first timing from the converted road surface observation data corresponding to the plurality of road surface observation data at the plurality of respective timings earlier than the first timing.

(Supplementary Note 28)

The program described in Supplementary note 27, for causing the computer to implement a function of detecting the abnormality of the road surface when a difference between the converted road surface observation data at the first timing and predicted low-dimensional road surface data at the first timing is equal to or larger than the threshold.

(Supplementary Note 29)

The program described in Supplementary note 23, for causing the computer to implement a function of generating a trained model by performing machine learning in such a manner that as a plurality of road surface observation data at a plurality of respective timings are entered into the trained model as inputs, road surface data at a timing next to a last timing of the plurality of timings is output from the trained model.

(Supplementary Note 30)

The program described in Supplementary note 29, for causing the computer to implement a function of performing the machine learning by using the road surface observation data of which a difference from the predicted road surface data is smaller than the threshold, and thereby updating a weight of the trained model.

(Supplementary Note 31)

The program described in Supplementary note 29, for causing the computer to implement:

- a function of performing the machine learning and thereby updating the weight of the trained model every time the road surface observation data is acquired, and
- a function of predicting the road surface data by using the updated weight.

(Supplementary Note 32)

The program described in Supplementary note 23, for causing the computer to implement a function of detecting the abnormality of the road surface by using the threshold set according to an attribute of the road surface.

(Supplementary Note 33)

The program described in Supplementary note 25, for causing the computer to implement a function of outputting a type of the detected abnormality.

While the disclosure has been particularly shown and described with reference to example embodiments thereof, the disclosure is not limited to these example embodiments. It will be understood by those of ordinary skill in the art that various changes in form and details may be made therein without departing from the spirit and scope of the present disclosure as defined by the claims.

What is claimed is:

1. A road surface abnormality detection apparatus comprising;

- a memory configured to store instructions; and
- a processor configured to execute the instructions to:
- acquire road surface observation data obtained by observing a road surface in a chronological order;
- convert the road surface observation data into road surface observation data composed of low-dimensional vector data having a smaller number of dimensions than that of a vector representing the road surface observation data;
- predict low-dimensional road surface data at a first timing from a plurality of the converted road surface observation data, corresponding to the road surface observation data, at a plurality of respective timings earlier than the first timing by using a trained model generated in advance through machine learning, the low-dimensional road surface data having dimensions corresponding to those of the low-dimensional vector data;
- detect, when a difference between the converted road surface observation data at the first timing and the predicted low-dimensional road surface data at the first timing is equal to or larger than a predetermined threshold, an abnormality of the road surface;
- generate, based on the detection, road surface abnormality information indicating where the road surface abnormality information was observed; and
- output, based on the road surface abnormality information, image data indicating where the abnormality of the road surface has been detected.

2. The road surface abnormality detection apparatus according to claim 1, wherein acquiring the road surface observation data includes using an observation apparatus configured to move along the road surface while observing the road surface.

3. The road surface abnormality detection apparatus according to claim 1, wherein the processor is further configured to execute the instructions to:

- perform, when an abnormality is detected in the road surface, a process for outputting information indicating that the abnormality has been detected in the road surface.

4. The road surface abnormality detection apparatus according to claim 3, wherein the processor is further configured to execute the instructions to:

- perform a process for displaying a symbol indicating a place where the abnormality has been detected in the road surface on a map on which the road surface is shown.

5. The road surface abnormality detection apparatus according to claim 1, wherein the processor is further configured to execute the instructions to:

- generate a trained model by performing machine learning in such a manner that as a plurality of road surface observation data at a plurality of respective timings are entered into the trained model as inputs, road surface data at a timing next to a last timing of the plurality of timings is output from the trained model.

6. The road surface abnormality detection apparatus according to claim 5, wherein the processor is further configured to execute the instructions to:

- perform the machine learning by using the road surface observation data of which a difference from the predicted road surface data is smaller than the threshold, and then update a weight of the trained model.

7. The road surface abnormality detection apparatus according to claim 6, wherein the processor is further configured to execute the instructions to:

- perform the machine learning and then update the weight of the trained model every time the road surface observation data is acquired, and
- predict the road surface data by using the updated weight.

8. The road surface abnormality detection apparatus according to claim 1, wherein the processor is further configured to execute the instructions to:

- detect the abnormality of the road surface by using the threshold set according to an attribute of the road surface.

9. The road surface abnormality detection apparatus according to claim 3, wherein the processor is further configured to execute the instructions to:

- perform a process for output of a type of the detected abnormality.

10. A road surface abnormality detection method comprising:

- acquiring road surface observation data obtained by observing a road surface in a chronological order;
- converting the road surface observation data into road surface observation data composed of low-dimensional vector data having a smaller number of dimensions than that of a vector representing the road surface observation data;
- predicting low-dimensional road surface data at a first timing from a plurality of the converted road surface observation data, corresponding to the road surface observation data, at a plurality of respective timings earlier than the first timing by using a trained model generated in advance through machine learning, the low-dimensional road surface data having dimensions corresponding to those of the low-dimensional vector data;

detecting, when a difference between the converted road surface observation data at the first timing and the predicted low-dimensional road surface data at the first timing is equal to or larger than a predetermined threshold, an abnormality of the road surface;

generating, based on the detection, road surface abnormality information indicating where the road surface abnormality information was observed; and outputting, based on the road surface abnormality information, image data indicating where the abnormality of the road surface has been detected.

11. The road surface abnormality detection method according to claim 10, wherein the road surface observation data is acquired by an observation apparatus configured to move along the road surface while observing the road surface.

12. The road surface abnormality detection method according to claim 10, wherein when an abnormality is detected in the road surface, a process for outputting information indicating that the abnormality has been detected in the road surface is performed.

13. The road surface abnormality detection method according to claim 12, wherein a process for displaying a symbol indicating a place where the abnormality has been detected in the road surface on a map on which the road surface is shown is performed.

14. The road surface abnormality detection method according to claim 10, a trained model is generated by performing machine learning in such a manner that as a plurality of road surface observation data at a plurality of respective timings are entered into the trained model as inputs, road surface data at a timing next to a last timing of the plurality of timings is output from the trained model.

15. The road surface abnormality detection method according to claim 14, wherein the machine learning is performed by using the road surface observation data of which a difference from the predicted road surface data is smaller than the threshold, and thereby a weight of the trained model is updated.

16. A non-transitory computer readable medium storing a program for causing a computer to implement:

a function of acquiring road surface observation data obtained by observing a road surface in a chronological order;

a function of converting the road surface observation data into road surface observation data composed of low-dimensional vector data having a smaller number of dimensions than that of a vector representing the road surface observation data;

a function of predicting low-dimensional road surface data at a first timing from a plurality of the converted road surface observation data, corresponding to the road surface observation data, at a plurality of respective timings earlier than the first timing by using a trained model generated in advance through machine learning, the low-dimensional road surface data having dimensions corresponding to those of the low-dimensional vector data;

a function of detecting, when a difference between the converted road surface observation data at the first timing and the predicted low-dimensional road surface data at the first timing is equal to or larger than a predetermined threshold, an abnormality of the road surface;

generating, based on the detection, road surface abnormality information indicating where the road surface abnormality information was observed; and outputting, based on the road surface abnormality information, image data indicating where the abnormality of the road surface has been detected.

* * * * *